United States Patent
Bandishte et al.

(10) Patent No.: US 12,430,135 B2
(45) Date of Patent: Sep. 30, 2025

(54) DEVICE, METHOD, AND SYSTEM TO FACILITATE IMPROVED BANDWIDTH OF A BRANCH PREDICTION UNIT

(71) Applicant: Intel Corporation, Santa Clara, CA (US)

(72) Inventors: Sumeet Bandishte, Indore (IN); Jayesh Gaur, Bangalore (IN); Franck Sala, Haifa (IL); Alexey Yurievich Sivtsov, Moscow (RU); Jared Warner Stark, IV, Portland, OR (US); Lihu Rappoport, Haifa (IL); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 17/558,361

(22) Filed: Dec. 21, 2021

(65) Prior Publication Data

US 2023/0195469 A1 Jun. 22, 2023

(51) Int. Cl.
*G06F 9/38* (2018.01)

(52) U.S. Cl.
CPC .......... *G06F 9/3848* (2013.01); *G06F 9/3861* (2013.01)

(58) Field of Classification Search
CPC ..... G06F 9/3808; G06F 9/3848; G06F 9/3861
See application file for complete search history.

(56) References Cited

U.S. PATENT DOCUMENTS

| | | | |
|---|---|---|---|
| 10,228,949 B2 | 3/2019 | Abdallah | |
| 10,248,570 B2 | 4/2019 | Abdallah et al. | |
| 10,613,867 B1* | 4/2020 | Srinivasan | G06F 9/3848 |
| 10,754,655 B2 | 8/2020 | Chauhan et al. | |
| 2004/0250054 A1 | 12/2004 | Stark | |
| 2005/0268075 A1 | 12/2005 | Caprioli et al. | |

(Continued)

OTHER PUBLICATIONS

Juan L. Aragón, José González, José M. García, and Antonio González, "Confidence Estimation for Branch Prediction Reversal", Jan. 1, Springer-Verlag Berlin Heidelberg, pp. 214-223 (Year: 2001).*

(Continued)

*Primary Examiner* — Courtney P Spann
(74) *Attorney, Agent, or Firm* — Essential Patents Group, LLP

(57) ABSTRACT

Techniques and mechanisms for a processor to determine an execution of instructions based on a prediction of a taken branch. In an embodiment, a first prediction unit generates each of multiple branch predictions in one cycle of successive branch prediction cycles. An indication of the branch predictions is provided to an execution pipeline, which prepares to execute an instruction based on the indication. Where a first one of the branch predictions is determined to be of a low confidence type, said first branch prediction is further indicated to a second prediction unit, which performs a second branch prediction based on the same branch instruction for which the first branch prediction was made. In another embodiment, the second prediction unit signals that a state of the execution pipeline is to be cleared, based on a determination that the first and second branch predictions are inconsistent with each other.

20 Claims, 16 Drawing Sheets

(56) References Cited

U.S. PATENT DOCUMENTS

| | | | |
|---|---|---|---|
| 2006/0036837 A1* | 2/2006 | Stark | G06F 9/3848 |
| | | | 712/239 |
| 2017/0139717 A1* | 5/2017 | Hornung | G06F 9/3844 |
| 2017/0277538 A1 | 9/2017 | Friedmann et al. | |
| 2018/0349144 A1 | 12/2018 | Pal et al. | |
| 2019/0213131 A1 | 7/2019 | Sabba et al. | |
| 2019/0258485 A1* | 8/2019 | Bouzgarrou | G06F 9/3844 |
| 2020/0310811 A1* | 10/2020 | Ishii | G06F 9/3846 |
| 2022/0129763 A1 | 4/2022 | Bandishte et al. | |
| 2023/0195468 A1* | 6/2023 | Bouzguarrou | G06F 9/3848 |
| | | | 712/239 |

OTHER PUBLICATIONS

Office Action from European Patent Application No. 22203532.1 notified Apr. 19, 2024, 4 pgs.

Notice of Allowance from European Patent Application No. 22203532.1 notified Oct. 9, 2024, 7 pgs.

Extended European Search Report from European Patent Application No. 22203532.1 notified Apr. 26, 2023, 5 pgs.

* cited by examiner

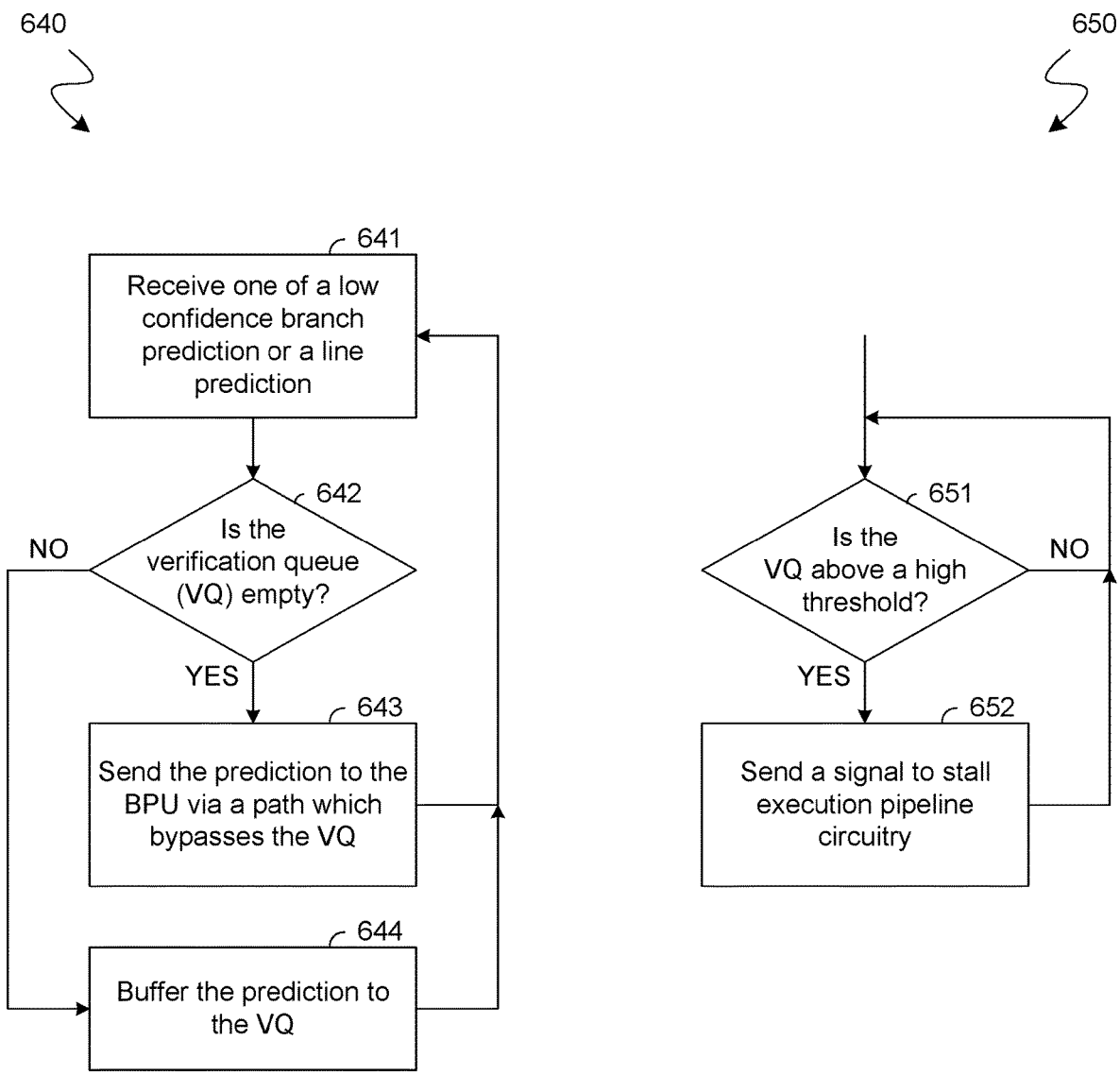

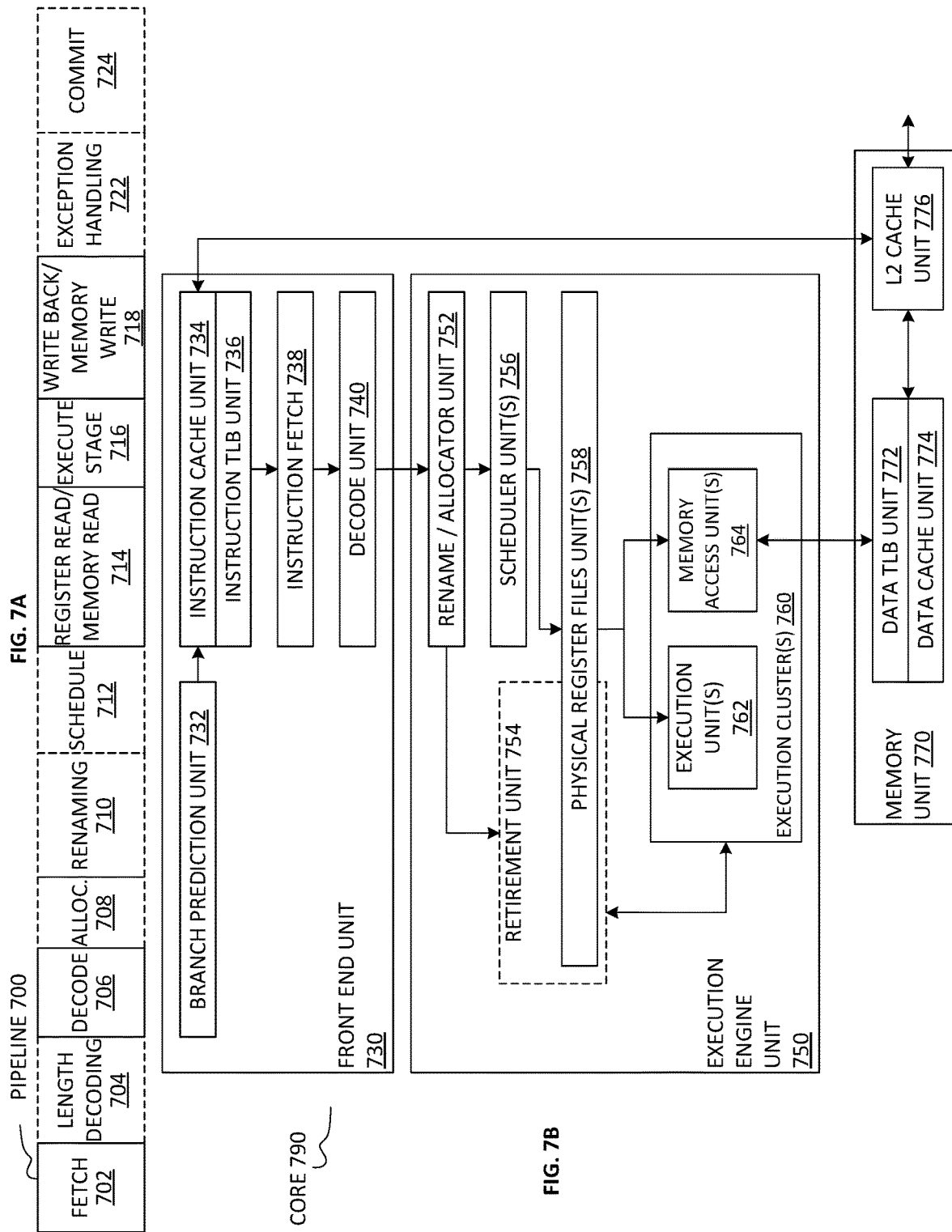

DEVICE, METHOD, AND SYSTEM TO FACILITATE IMPROVED BANDWIDTH OF A BRANCH PREDICTION UNIT

BACKGROUND

1. Technical Field

This disclosure generally relates to processor technology, branch prediction technology, and branch offset prediction technology.

2. Background Art

Some central processor unit (CPU) cores utilize speculative execution to avoid pipeline stalls and achieve better performance, which allows execution to continue without having to wait for the architectural resolution of a branch target. Branch prediction technology utilizes a digital circuit that guesses which way a branch will go before the branch instruction is executed. Correct predictions/guesses improve the flow in the instruction pipeline.

In general, there are two kind of branch predictions: branch prediction for conditional branches, which are understood as a prediction for the branch as "taken" vs. "not-taken"; and branch target prediction for unconditional branches, including both direct and indirect branches. Indirect branch prediction is an important part of the overall branch prediction, because an indirect branch typically involves higher latency in its target resolution, especially for a memory indirect branch the target of which needs to be fetched from a specific memory location. A branch prediction unit (BPU) supports speculative execution by providing a predicted target to the front-end (FE) of a CPU based on the branch instruction pointer (IP), branch type, and the control flow history (also referred as branch history) prior to the prediction point.

BRIEF DESCRIPTION OF THE DRAWINGS

The various embodiments of the present invention are illustrated by way of example, and not by way of limitation, in the figures of the accompanying drawings and in which:

FIG. 6A through 6E shows flow diagrams each illustrating features of a respective method to operate a processor according to a corresponding embodiment.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to an embodiment.

DETAILED DESCRIPTION

Figure 1A:
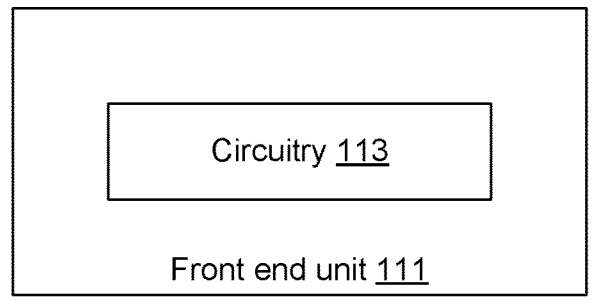
FIG. 1A shows a functional block diagram illustrating features of a processor to execute instructions based on branch predictions according to an embodiment.

Embodiments discussed herein variously provide techniques and mechanisms for determining an execution of instructions based on a prediction of a taken branch. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor or other circuitry suitable to execute instructions.

Some embodiments advantageously provide technology for a multi-offset predictor (MOP). In some embodiments, "offset" refers in this context to a relative location in a cache line. Modern superscalar processors achieve higher performance by extracting more instruction level parallelism (ILP) from the workloads. To facilitate this, superscalar processors employ ever growing Out-of-Order (OOO) instructions windows to identify more and more independent instructions. To support such wide and deep machines, the Front-End of the processor needs to provide a very high sustained instruction bandwidth to the OOO.

A major limiter of Front-End bandwidth is the Branch Prediction Unit (BPU). For example, one type of conventional BPU uses a Program Counter (PC) and Branch History (Stew) to predict each branch in a given cache-line, and then determine the first taken branch out of all the branches. After that, the BPU discards all instructions following the first taken branch. In the next cycle, the BPU operation restarts from the target of the branch instruction. Accordingly, every taken branch causes a BPU re-steering event which involves discarding unused fetched bytes and a cycle change. This limits the overall bandwidth of the Front-End and the performance of the processor.

To solve the above problem, some embodiments variously facilitate operation of a MOP which enables a very high sustained BPU bandwidth. Various embodiments of the MOP utilize the PC and Stew (e.g., a current program state), and identify a predicted next N taken branches, and their respective targets, in the program flow. In one such embodiment, the MOP directly jumps, in a next cycle, to the target of the predicted Nth taken branch.

Where a conventional predictor predicts each branch in a cache-line and then picks the first taken branch amongst them (if any), embodiments of the MOP directly produce the relative positions of some next N taken branches from the current PC and the targets of the next N taken branches. This is a major micro-architectural benefit of some embodiments. Additionally, in contrast to a conventional predictor which is re-steered after every taken branch, some embodiments of the MOP are re-steered only after N taken branches, effectively making a bandwidth of the MOP N times that of a conventional predictor. Accordingly, some embodiments provide a much higher BPU bandwidth using a very simple microarchitecture and low storage.

Some predictors utilize Path-based Next Trace prediction (PNT), where a Next-Trace predictor predicts units of traces. Compared to a conventional branch predictor which predicts every branch, the PNT predictor predicts an entire trace in one shot. The PNT predictor records sequences of traces as the path history of the program and uses the recorded sequence to predict the next trace.

Decoded stream buffer (DSB) simple-stream (DSS) technology identifies stable code regions in which the control flow is always constant. Such control flows are generally a result of always-taken or always-not-taken branches in the program. For such code regions, DSS records the DSB pointers to all micro-ops belonging to this region. Next time the same code region is encountered, DSS provides all the pointers to the DSB from where a stream of micro-ops is read out and supplied to the next pipeline stages. The main BPU is not consulted during this time. Accordingly, DSS can supply a stream of instructions spanning multiple taken branches in a single cycle without any BPU re-steering operation, opportunistically increasing the Front-End bandwidth.

Some high confidence multiple branch offset (HCoMB) predictors are trace predictors which predict N taken branches per cycle (e.g., where N is an integer greater than 1). However, a HCoMB predictor is usually an opportunistic predictor which predicts only in those cases when it has sufficient confidence for all N predictions in the trace. When such a HCoMB predictor does not have sufficient confidence, predictions are instead given by a main branch prediction unit (BPU). Thus, a HCoMB predictor has a low coverage of taken branches. Often, HCoMB prediction can avail of N predicted branches only when there is high confidence on all the N predictions in a trace. If any of the predictions has low confidence, then prediction of the trace by the HCoMB does not occur.

The PNT predictor only supports a limited trace size (e.g., 16 instructions) or a limited number of branches (taken or not-taken), which is too small and not suitable to support the bandwidth requirements of very wide, deep OOO cores. In contrast, embodiments of the MOP provide information on the next N taken branches, which constitute an arbitrarily very long trace if the N taken branches are far apart. Also, the PNT predictor does not check if the branches are taken or not-taken. If a certain program region has many consecutive not-taken branches, the PNT predictor will break the entire region into multiple traces of six (6) branches each and take multiple cycles to predict this entire region. In contrast, embodiments of the MOP accommodate taken branches (rather than not-taken branches) because not-taken branches do not change the natural control flow of a program and hence, do not need prediction. By implicitly predicting not-taken branches, a MOP prediction spans a much larger code region than that covered by a single PNT prediction. Therefore, MOP prediction can provide a much higher throughput at much lower storage than the PNT predictor.

DSS relies on the DSB implementation. It only records DSB pointers whereas the actual micro-ops must be supplied by the DSB itself. Therefore, DSS requires inclusivity in the DSB. If the micro-ops are not present in DSB, DSS cannot give out a stream-prediction. Embodiments of the MOP do not have any dependency on the DSB. A MOP works as a standalone branch predictor. In terms of branch stability versus prediction stability, DSS relies very much on the stability of a given branch (e.g., DSS only works when branches are always-taken or always-not-taken). If a branch has inconsistent behavior, DSS cannot reliably handle it. Embodiments of the MOP, on the other hand, rely on prediction stability which means an MOP also works very well with branches that change behavior over time if the change can be accurately predicted. For example, embodiments of the MOP incorporate the branch history (Stew) in its prediction to work better with branches that change behavior over time. The branch history allows embodiments of the MOP to distinguish between each taken or not-taken instance of the same branch and therefore, accurately predict each instance separately. This contrast between branch stability and prediction stability gives embodiments of the MOP a superior coverage and performance over DSS.

Some embodiments of a MOP predict multiple taken branches per cycle and, for example, jump to the target of the last predicted taken branch. Given the current PC and Stew, some embodiments of the MOP generate pointers to the next N branches which are predicted to be taken. Using these pointers, the PC of the taken branch and its target are accurately identified and thus, an entire control flow is constructed from a current point until the Nth taken branch. In one such embodiment, any of the N branch predictions which is determined to be of low confidence is sent to another prediction unit, which performs its own branch prediction, for the same branch instruction, in addition to the low confidence branch prediction. If the additional branch prediction is determined to be inconsistent with the low confidence branch prediction, the prediction unit generates a signal to flush or otherwise clear at least some execution state of an execution pipeline which would otherwise execute instructions based on the N branch predictions. Advantageously, some embodiments provide a mechanism to enhance the bandwidth of the front end (FE) of the processor, which is a critical limitation when scaling the depth-width of processor cores. Further, some embodiments are highly area efficient and leverage existing hardware structures in the front end for most of the work. Thus, some embodiments provide a simple way to support an important requirement of a wide variety of processors.

In various embodiments, a MOP prediction is not dependent on the confidence associated with the predictions. For example, if a trace is present in the MOP table, it can be predicted irrespective of the confidence of the individual predictions in that trace. Thus, MOP provides multiple predictions per cycle even when the confidence of individual predictions is low. Therefore, MOP has a much higher prediction coverage than the HCoMB predictor and hence, offers higher performance as well.

Although some embodiments are not limited in this regard, an MOP supports operation with a buffer—referred to herein as a verification queue (VQ)—which is not present, for example, in existing HCoMB predictors. In one such embodiment, any branch prediction which is not of a high confidence prediction type is buffered in a verification queue, and subsequently dequeued to an additional prediction unit for validation. If a mismatch is detected between the respective predictions by the MOP and the additional prediction unit, a front end clear (or other such signal) is issued. This feature allows an additional prediction unit to run in the background and not affect the front end bandwidth.

FIG. 1A shows features of a processor 100 to execute instructions based on branch predictions according to an embodiment. Processor 100 illustrates one example of an embodiment wherein circuitry provides functionality to selectively clear a state of an execution pipeline based on an invalidity of a branch prediction. In an embodiment, an evaluation of the branch prediction (the evaluation to detect for the invalidity) is performed based on a low confidence classification of the branch prediction. Alternatively or in addition, the branch prediction is one of multiple branch predictions which are each provided, or otherwise indicated, to the execution pipeline—e.g., wherein the multiple branch predictions are determined in a single cycle of a sequence of prediction cycles.

As shown in FIG. 1A, processor 100 comprises a front end unit 111 and circuitry 113 coupled to front end unit 111, where circuitry 113 is configured to provide a multi-offset predictor (MOP). For example, circuitry 113 is configured to access an entry, in a multiple-taken-branch (MTB) prediction table, which corresponds to a conditional branch instruction, and to provide or otherwise indicate to an execution pipeline some N successive branch predictions (where N is an integer greater than 1) that are expected to stem from that conditional branch instruction. For example, circuitry 113 is configured to generate tag information for a conditional branch instruction—e.g., based on a last taken branch and a branch history—and to identify an entry in the MTB table based on the generated tag information.

In some embodiments, circuitry 113 is configured to predict N taken branches per cycle and then jump to the target of the last predicted taken branch. In some embodiments, circuitry 113 is further configured to generate pointers to the next N branches which are predicted to be taken based on a current PC and branch history (stew). In some embodiments, circuitry 113 is further configured to identify the PC of the taken branch and its target based on the generated pointers. For example, circuitry 113 is configured to construct an entire execution control flow from a current point until the Nth taken branch based on the generated pointers.

In some embodiments, circuitry 113 is further configured to write to, read from, and/or otherwise access a registry (e.g., implemented with a MTB table, with a separate trace table, and/or with one or more other suitable data structures) of confidence metrics which each correspond to a respective branch prediction. In one such embodiment, circuitry 113 is further configured to evaluate one such confidence metric to determine whether (or not)—according to some predetermined criteria—a corresponding branch prediction is of a "low confidence" type or a "high confidence" type. For example, circuitry 113 is configured to compare a confidence metric to a predetermined value representing a threshold minimum confidence level.

In various embodiments, circuitry 113 is further configured to provide or otherwise indicate a low confidence prediction to another prediction unit, which is to subject said low confidence prediction to further evaluation. For example, the other prediction unit is to determine whether the low confidence prediction is valid according to (e.g., is consistent with) some additional prediction criteria.

Figure 13:
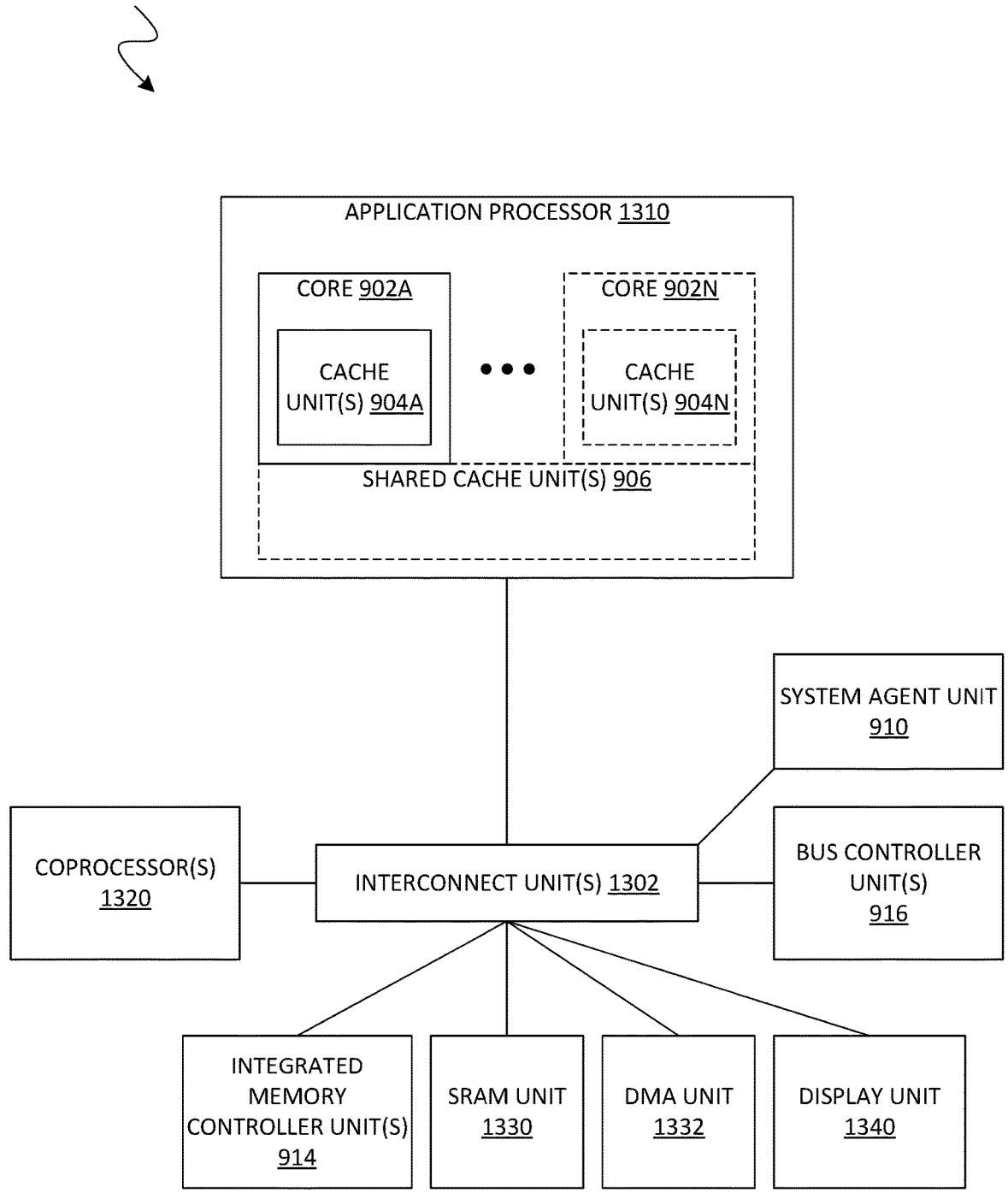
Figure 14:
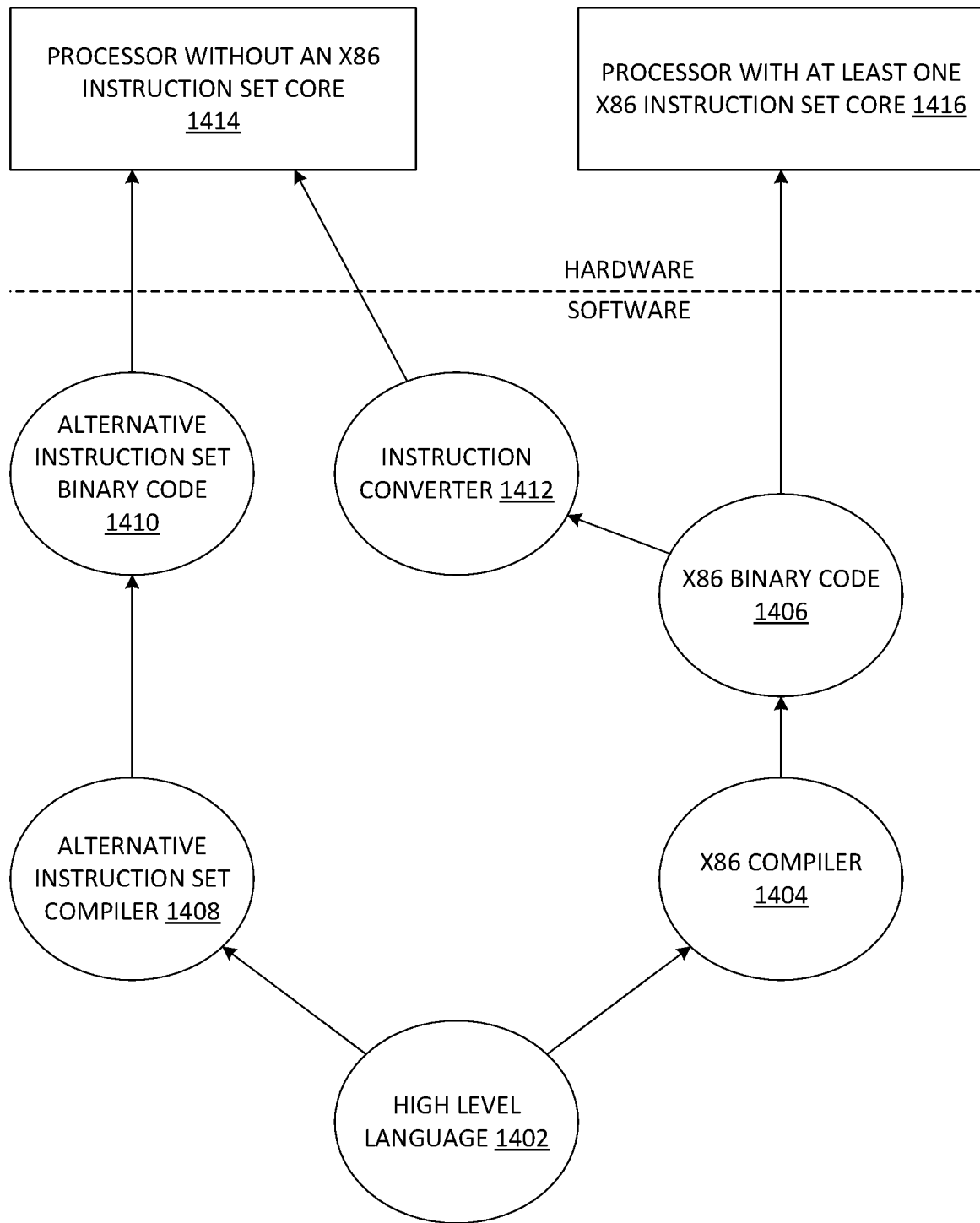
FIG. 14 is a block diagram contrasting the use of a software instruction converter to convert binary instructions in a source instruction set to binary instructions in a target instruction set according to an embodiment.

Embodiments of front end unit 111 and/or circuitry 113 are incorporated in a processor including, for example, the core 790 (in FIG. 7B), the cores 902A-N (in FIGS. 9, 13), the processor 1010 (in FIG. 10), the co-processor 1045 (in FIG. 10), the processor 1170 (in FIGS. 11-12), the processor/coprocessor 1180 (in FIGS. 11-12), the coprocessor 1138 (in FIGS. 11-12), the coprocessor 1320 (in FIG. 13), and/or the processors 1414, 1416 (in FIG. 14). In particular, embodiments of circuitry 113 are incorporated in the front end unit 730 (in FIG. 7B).

Figure 1B:
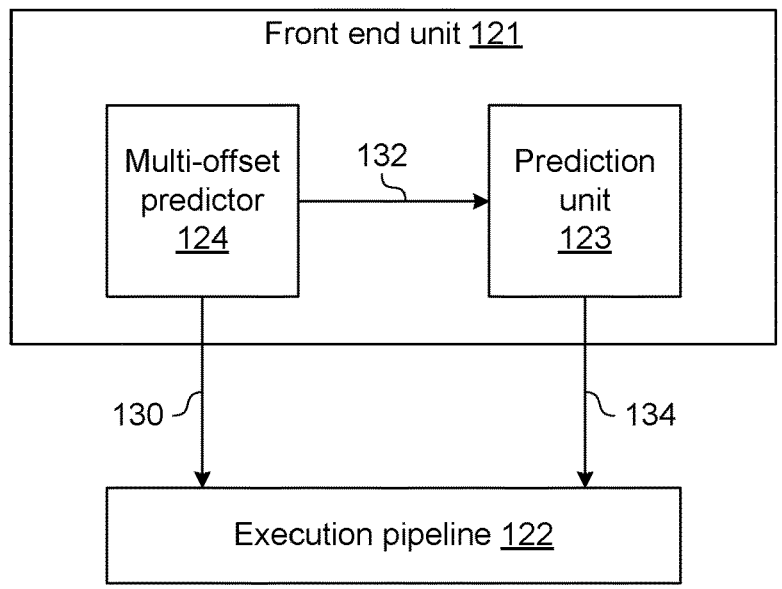
FIG. 1B shows a functional block diagram illustrating features of a processor to provide branch prediction information according to an embodiment.

FIG. 1B shows features of a processor 120 to provide branch prediction information according to an embodiment. Processor 120 provides functionality such as that of processor 100, for example. As shown in FIG. 1B, processor 120 comprises a front end unit 121 to decode one or more instructions, and an execution pipeline 122 communicatively coupled to front end unit 121 to execute the decoded one or more instructions.

Front end unit 121 includes a prediction unit 123 to selectively provide branch prediction functionality for one or one or more instructions, and a multi-offset predictor (MOP) 124 communicatively coupled to the prediction unit 123, the MOP 124 including circuitry to predict multiple taken branches per cycle and then (for example) jump to the target of the last predicted taken branch.

In various embodiments, circuitry of MOP 124 (e.g., including some or all of circuitry 113) generates multiple branch predictions in a single cycle of a sequence of prediction cycles—e.g., wherein a duration of the cycle is equal to that of a single cycle of a clock signal which regulates operations of processor 120. Functionality of MOP 124 is adapted, for example, from conventional techniques and mechanisms to generate multiple branch predictions in a single cycle. The details of such conventional techniques and mechanisms are not limiting on some embodiments, and are not detailed herein to avoid obscuring certain features of said embodiments.

In some embodiments, circuitry of MOP 124 (or alternatively, circuitry coupled to MOP 124) is configured to access a registry of confidence metrics which each correspond to a respective one of the N branch predictions. In one such embodiment, the circuitry is further configured to determine, based on confidence metrics, whether respective confidences in the branch prediction are variously greater than, or less than, a threshold confidence level.

In the example embodiment shown, MOP 124 detects an instance of N branch predictions—e.g., wherein MOP 124 identifies or otherwise detects, in a single cycle, N branch predictions which each correspond to a respective branch instruction in a software program. The N branch predictions have a relative order, with respect to each other, in an execution sequence of the software program. For example, one or more of the N branch predictions are each predicated on a respective earlier one of the N branch predictions in the sequence. Based on the detected instance, MOP 124 provides to execution pipeline 122 one or more indications of the N branch predictions—e.g., via the illustrative signal 130 shown. For example, for one or more of the N branch predictions, signal 130 identifies (e.g., includes) or otherwise indicates an expected next instruction to be performed after said branch prediction. Additionally or alternatively, for some or all of the N branch predictions, signal 130 explicitly identifies said branch prediction.

In some embodiments, circuitry of MOP 124 (or alternatively, circuitry coupled to MOP 124) is further configured to provide or otherwise indicate to prediction unit 123—e.g., via signal 132—any of the N branch predictions which are determined to be of a low confidence type. Circuitry of prediction unit 123 is configured to determine, for any such low confidence prediction, whether the prediction is consistent with an additional branch prediction which prediction unit 123 performs independently, using additional prediction criteria, for the corresponding branch instruction. The low confidence prediction is determined to be "valid" where it is found to be consistent with the additional prediction performed by prediction unit 123, and "invalid" where the two branch predictions are inconsistent with each other. Where a low confidence branch prediction is determined to be invalid, prediction unit 123 provides an indication—e.g., via the illustrative signal 134 shown—that at least some state of execution pipeline 122 is to be cleared. Based on signal 134, some or all of the current execution state of execution pipeline 122 is flushed—e.g., to facilitate subsequent operations to recover from an invalid branch prediction.

Figure 2:
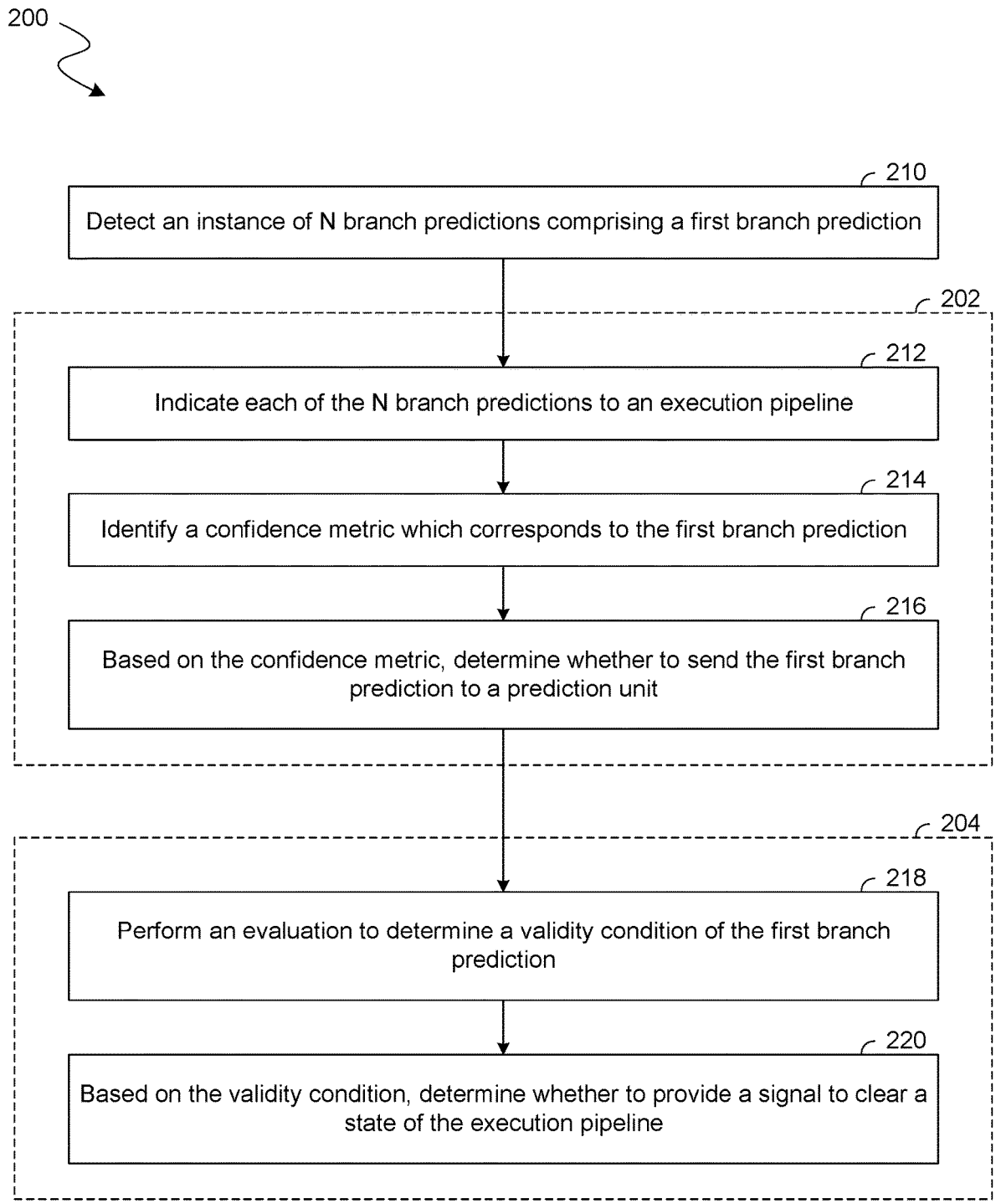
FIG. 2 shows a flow diagram illustrating features of a method to operate a processor based on branch prediction information according to an embodiment.

FIG. 2 shows features of a method 200 to operate a processor based on branch prediction information according to an embodiment. The method 200 illustrates one example of an embodiment which facilitates an execution of one or more instructions based on the detection of a sequence of predicted taken branches, wherein at least one such predicted taken branch is selectively provided, based on a corresponding confidence metric, to determine whether such execution should be stopped, cleared and/or otherwise interrupted. Operations such as those of method 200 are performed, for example, with processor 100 or processor 120.

As shown in FIG. 2, method 200 comprises (at 210) detecting an instance of N branch predictions comprising a first branch prediction, wherein N is an integer greater than one. For example, the detecting at 210 comprises an MOP of the processor identifying each of the N branch predictions in a first cycle of a sequence of branch prediction cycles. In an embodiment, one or more of the N branch predictions are each based on a respective other one of the N branch predictions—e.g., wherein the N branch predictions each correspond to a different respective branch instruction of an expected execution flow of a software process.

Method 200 further comprises operations 202 which are performed based on the instance which is detected at 210. In an embodiment, operations 202 comprise (at 212) indicating each of the N branch predictions to an execution pipeline. For example, the indicating at 212 comprises, for one or more of the N branch instructions, specifying or otherwise indicating to the execution pipeline a respective next instruction which is expected after a corresponding branch instruction for which the branch prediction was made. In one such embodiment, the indicating at 212 comprises providing an indication of at least a next expected instruction after the Nth branch instruction in an expected execution flow.

In some embodiments, the indicating at 212 comprises, or is otherwise based on, selecting an indication of one of the N branch predictions over an indication of a different prediction other than any of the N branch predictions. By way of illustration and not limitation, a processor performing method 200 further comprises line predictor, and a multiplexer and/or other suitable circuitry to select between the line predictor, and the MOP which performs the detecting at 210. Such selection is based, for example, on a hit resulting from a search of a trace table or other suitable registry of confidence metrics for the N branch predictions. By contrast, in an alternative scenario wherein the search fails to result in the hit, a prediction from the line predictor is instead provided to the execution pipeline.

Operations 202 further comprise (at 214) identifying a confidence metric which corresponds to the first branch prediction, and (at 216) determining, based on the confidence metric, whether to send the first branch prediction to a prediction unit of the processor. For example, the MOP includes, is coupled to, or is otherwise configured to operate with, a registry of confidence metrics each for a different respective branch prediction. In one such embodiment, entries of the registry each correspond to a different respective set of N branch predictions—e.g., wherein a given one such entry comprises N confidence metrics each for a different respective one of the N branch predictions.

Although some embodiments are not limited in this regard, method 200 further comprises operations 204 which are performed in a circumstance wherein—based on the determining at 216—the first branch prediction is sent to the prediction unit. In one such embodiment, operations 204 comprise (at 218) performing an evaluation, with the prediction unit, to determine a validity condition of the first branch prediction.

For example, the first branch prediction corresponds to a first branch instruction—e.g., wherein the first branch prediction is based on a PC value which identifies the first branch instruction. In one such embodiment, determining the validity condition at 218 comprises the prediction unit generating a second branch prediction based on the first branch instruction (e.g., based on the same PC value), and determining whether the first branch prediction is consistent with the second branch prediction. The first branch prediction is considered valid where it is determined to be consistent with the second branch prediction, or (alternatively) is considered invalid where it is instead determined to be inconsistent with the second branch prediction.

In an embodiment, operations 204 further comprise (at 220) determining, based on the validity condition, whether to provide a signal to clear a state of the execution pipeline. For example, some or all execution state of the execution pipeline is cleared where the first branch prediction is determined to be invalid—e.g., by flushing the respective execution state for any instruction currently being processed by the execution pipeline. By contrast, such clearing of the execution pipeline is to be avoided, or at least delayed, where the first branch prediction is determined to be valid.

In some embodiments, method 200 further comprises additional operations (not shown) which are performed in the circumstance wherein the first branch prediction is sent to the prediction unit. For example, in some embodiments, the processor performing method 200 provides functionality to buffer a given prediction prior to an evaluation of said prediction by the prediction unit. In one such embodiment, method 200 further comprises debuffering that given prediction (e.g., one other than the first branch prediction) from the buffer, and then sending the prediction to the prediction unit. Method 200 further comprises (for example) determining that said buffer is currently empty and, based on such a determination, communicating the first branch prediction to the prediction unit via a path which bypasses the buffer.

Additionally or alternatively, such additional operations of method 200 comprise detecting a condition wherein a utilization of such a buffer is above a threshold level, and—based on the condition—generating a second signal to reduce an operational rate of the execution pipeline. In one such embodiment, detecting the condition comprises detecting that the buffer is currently full, wherein the second signal is to at least temporarily stop an execution of instructions by the execution pipeline. In some embodiments, after generating this second signal, method 200 further detects a current availability of space at the buffer, wherein—based on the availability—a third signal is provided to increase the operational rate of the execution pipeline.

In an alternative embodiment, the detected condition comprises a total number of predictions enqueued to the buffer currently being greater than a threshold number, while also being less than a maximum number of predictions which the buffer is able to accommodate. In such an embodiment, based on the second signal, the execution pipeline transitions from a first positive rate of instruction execution to a second positive rate of instruction execution (which is less than the first positive rate). Subsequently, in some embodiments, method 200 detects that the total number of predictions enqueued to the buffer is currently less than the threshold number. Based on such detecting, method 200 generates a third signal to increase the operational rate of the execution pipeline.

In various embodiments, method 200 additionally comprises operations to variously update one or more confidence metrics which each correspond to a different respective branch prediction. In one such embodiment, method 200 detects whether the first branch prediction had a successful outcome or, alternatively, an unsuccessful outcome. For example, a branch prediction has a successful outcome where the first branch prediction correctly indicates the branch which was actually taken by a subsequent execution of a corresponding branch instruction. Additionally or alternatively, the branch prediction has a successful outcome where it passes a validity test such as one performed at 218.

In various embodiments, method 200 updates a value of a confidence metric (the updating based on the successful outcome of the first branch prediction) to indicate an increased confidence in the first branch prediction. Alternatively, where an unsuccessful outcome of the first branch prediction is detected, method 200 updates such a value to indicate a decreased confidence in the first branch prediction—for example, wherein the value is decremented by some predetermined number or, alternatively, is reset to some baseline value (e.g., zero).

Figure 3A:
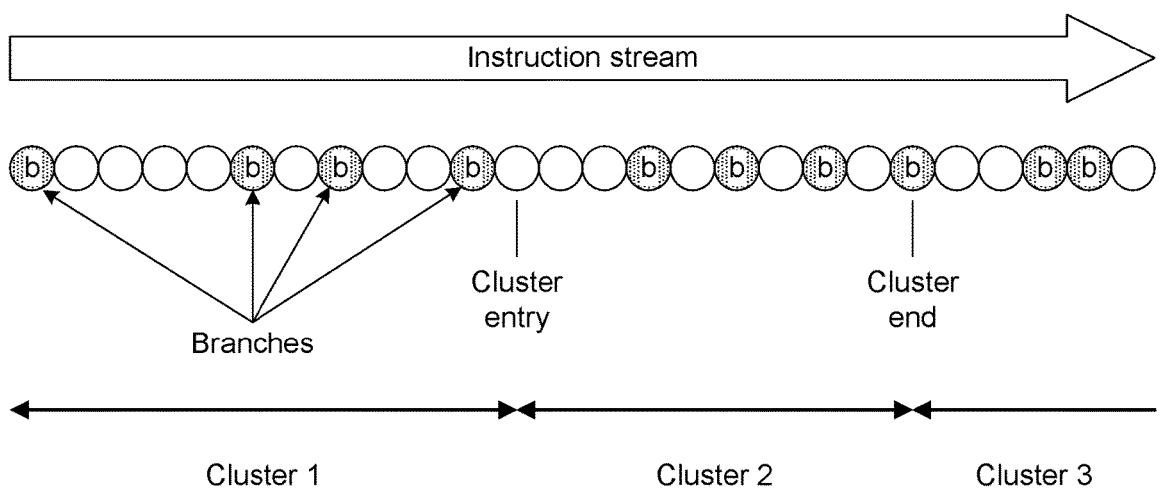
FIG. 3A shows a timing diagram illustrating features of branch predictions performed during a single cycle according to an embodiment.

FIG. 3A shows a timing diagram 300 illustrating branch predictions which are performed during a single cycle according to an embodiment. In various embodiments, timing diagram 300 illustrates operations by one of processors 100, 120—e.g., wherein method 200 includes or is otherwise based on such operations. As shown in FIG. 3A, a software program comprises a fetched instruction stream which is broken into multiple traces comprising N taken branches each, wherein N is an integer—in this example, four (4)—which is greater than one (1).

Some embodiments of a MOP snoop the instruction stream, and record the taken branches—e.g., in a N-entry buffer. When the buffer is full, the sequence of N taken branches, referred to herein collectively as a trace, are registered in an entry of a table (referred to herein as a "trace table") or other suitable registration resource. The entry is identified using index information, such as a hash value which is calculated based on a PC associated with one of the taken branches (e.g., a PC for a branch instruction, or for a target instruction), and/or based on a branch history of the program up to the point of one of the N taken branches. After a trace is registered, the buffer is cleared to accommodate training for a next trace in the instruction stream.

In various embodiments, a trace entry registers the N branch predictions and, for each such branch prediction, a different respective confidence metric which indicates a confidence in that branch prediction. For example, a confidence metric for a given branch prediction is set to some baseline value when a trace is initially registered. As one or more later instances of the same N branch predictions are subsequently detected, that confidence metric is variously increased, decreased, reset, or otherwise changed—e.g., according to the corresponding branch prediction having an outcome which was successful, or unsuccessful.

Figure 3B:
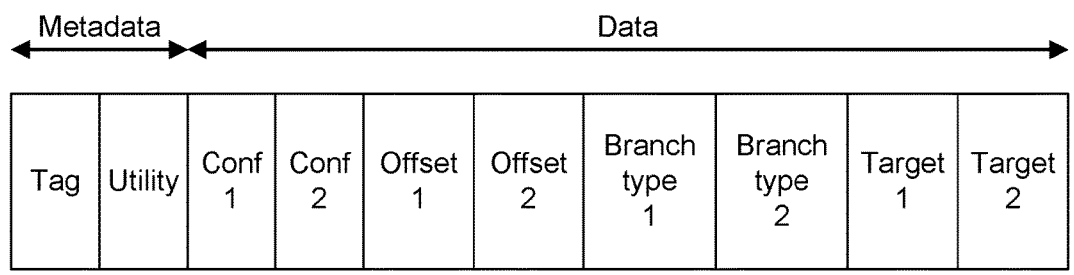
FIG. 3B shows a data diagram illustrating a format of prediction trace information according to an embodiment.

FIG. 3B shows features of a registered trace 310, which provides branch prediction information according to an embodiment. In various embodiments, trace 310 is used by one of processor 100 or processor 120—e.g., wherein one or more operations of method 200 are determine and/or use trace 310. FIG. 3B is an illustrative diagram of an example format of a trace table entry. To facilitate a prediction lookup, some embodiments of a MOP comprise, are coupled to, or otherwise operate with a single set-associative table which stores all information required to identify a branch prediction. In one such embodiment, each entry in the trace table holds data regarding a respective one (1) trace in the program. An example MOP table entry appears as shown in FIG. 3B.

As shown in FIG. 3B, trace 310 comprises a tag field to store an index value which facilitates a search for the entry in the trace table. In some embodiments, trace 310 further comprises a utility field to store a value which indicates a current number of search "hits"—i.e., a number of times that the entry has been the subject of a trace table search. Trace 310 further comprises confidence metrics (Conf 1, Conf 2) each to indicate a respective level of confidence in a respective one of the N branch predictions—in this example, two (2) predictions—which are represented by trace 310. Trace 310 further comprises offset fields (Offset 1, Offset 2) each to provide a respective value which indicates an offset location, in an instruction cache, for a cached instruction which corresponds to a respective one of the N branch predictions. Trace 310 further comprises branch type fields (Branch type 1, Branch type 2) each to indicate, for a corresponding one of the N branch predictions, a respective branch type of a branch instruction for which the branch prediction is made. Trace 310 further comprises target fields (Target 1, Target 2) which are each to indicate a respective location of a next instruction which is expected to be targeted by a corresponding predicted branch.

Figure 4:
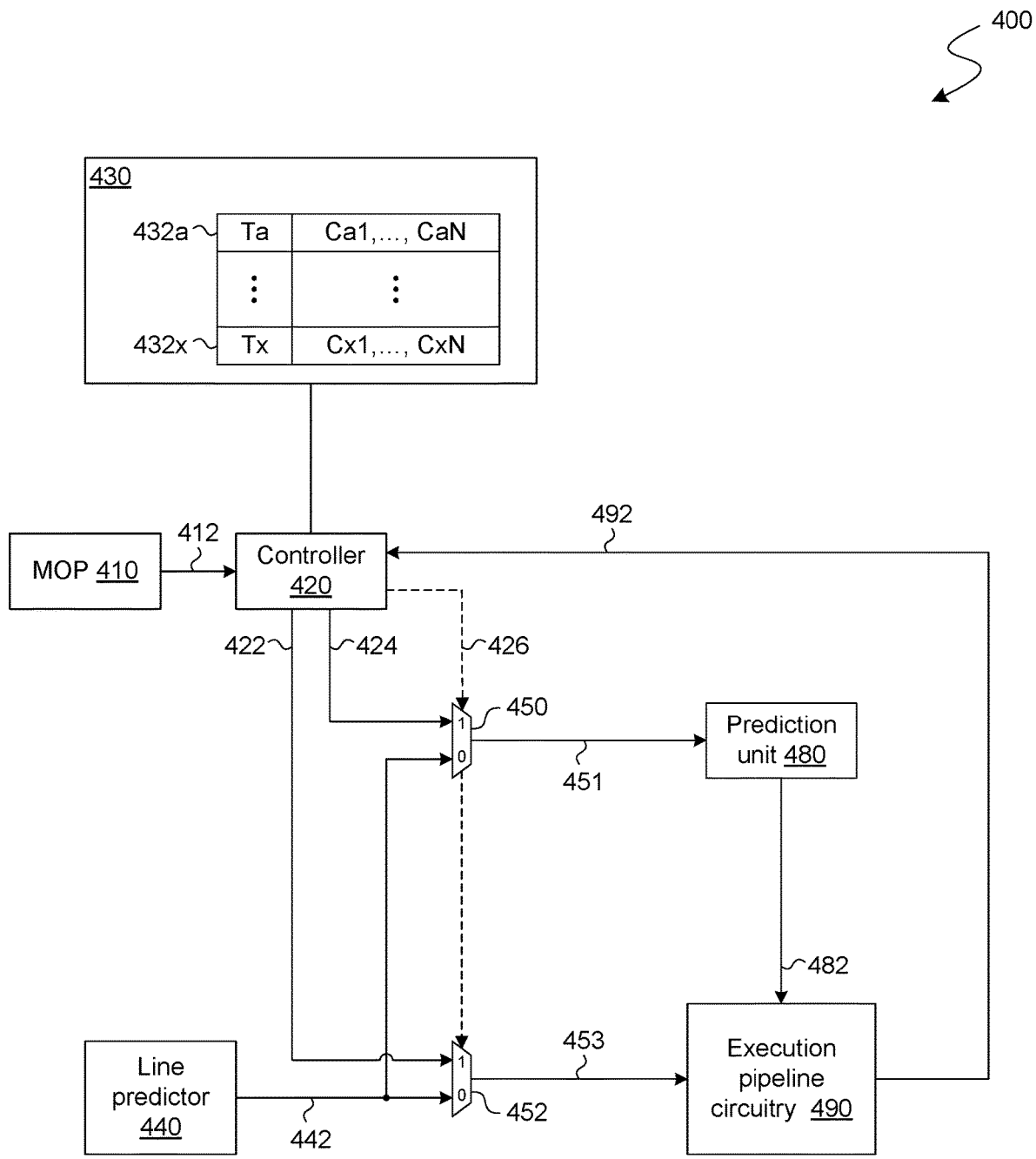
FIG. 4 shows a functional block diagram illustrating features of a processor to evaluate branch predictions based on confidence information according to an embodiment.

FIG. 4 shows features of a processor 400 to evaluate branch predictions based on confidence information according to an embodiment. The processor 400 illustrates one example of an embodiment wherein N branch predictions are indicated to an execution pipeline, wherein one or more of the N branch predictions are also subject to being selected for validity testing to determine whether state of the execution pipeline is to be cleared. In various embodiments, processor 400 provides functionality such as that of processor 100 or processor 120—e.g., wherein one or more operations of method 200 are performed with processor 400.

Figure 6A:
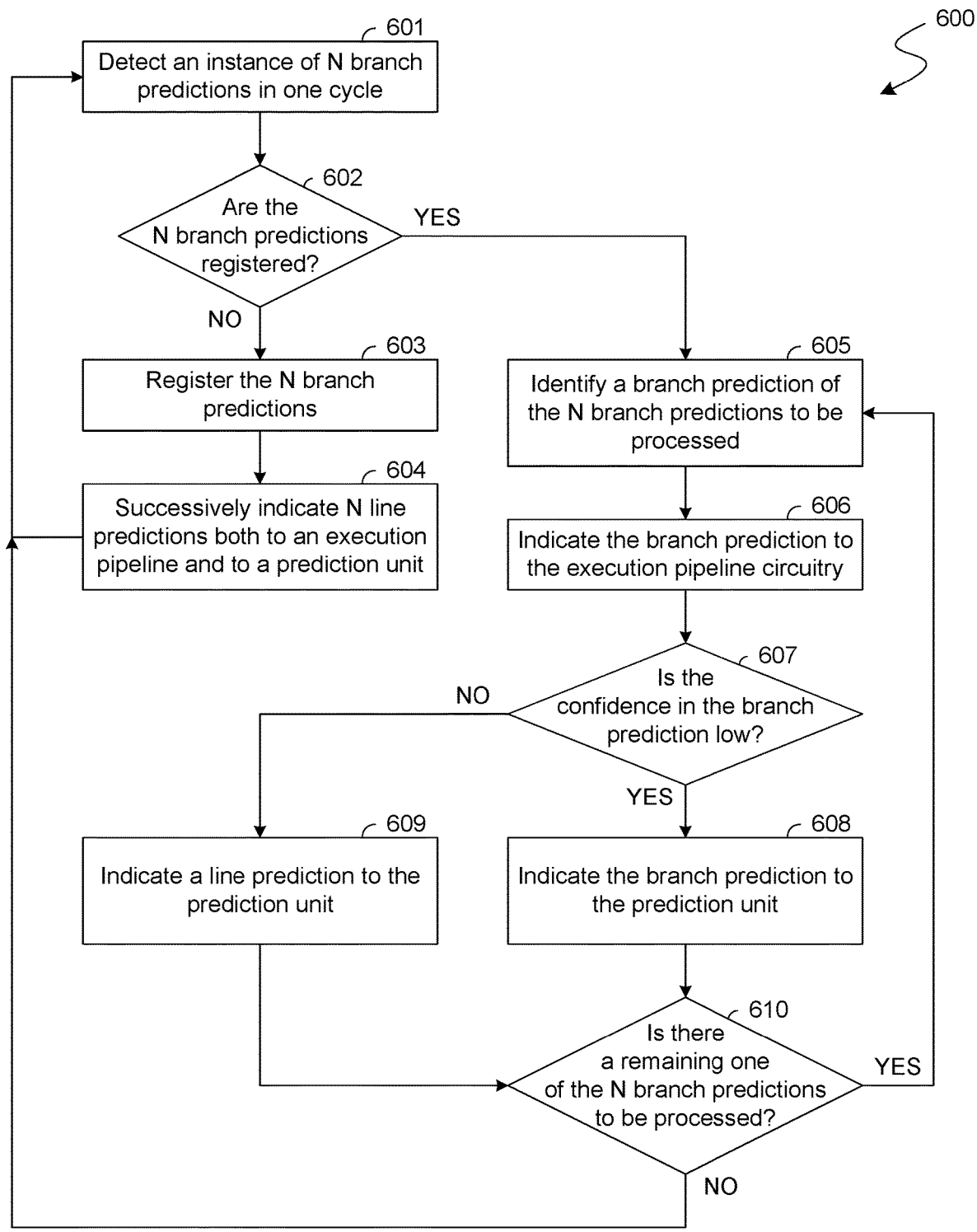
Figures 6B, 6C:
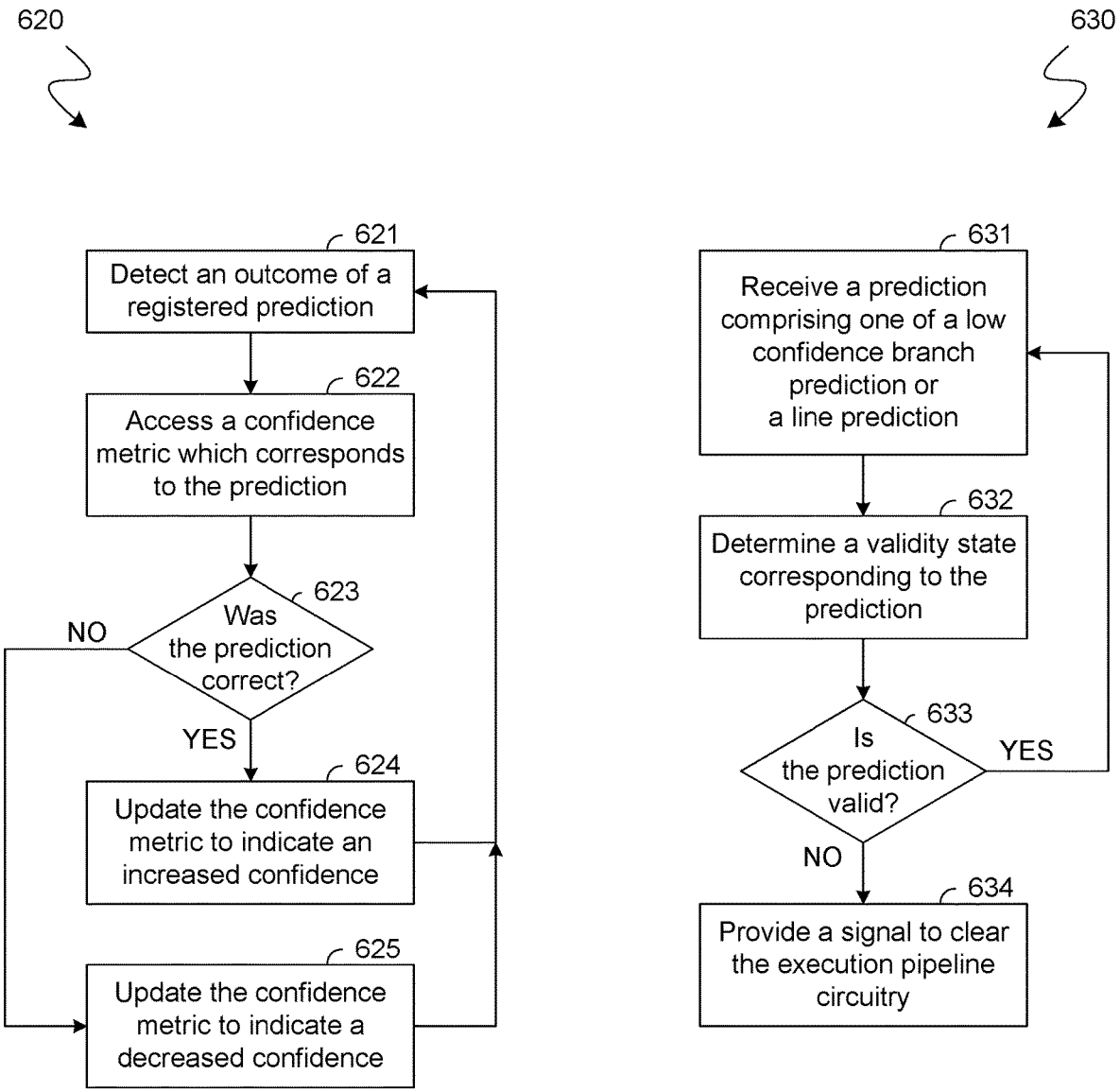

To illustrate certain features of various embodiments, methods 600, 620, 630—shown in FIGS. 6A, 6B, 6C (respectively)—are variously described herein with reference to operations by the example processor 400. However, in other embodiments, one or more operations of method 600, 620, or 630 are performed with any of various other suitable devices which provide functionality described herein.

As shown in FIG. 4, processor 400 comprises a MOP 410, a prediction unit 480, execution pipeline circuitry 490, and a controller 420 which facilitates the indicating of branch predictions to execution pipeline circuitry 490 (and, under certain circumstances, to prediction unit 480). In an embodiment, MOP 410 comprises application specific integrated circuitry, and/or any of various other suitable integrated circuits, which provides functionality to identify each of N branch predictions in a single branch prediction cycle. For example, processor 400 includes some or all of the features of MOP 124—e.g., wherein prediction unit 480 and execution pipeline circuitry 490 correspond functionally to prediction unit 123, and execution pipeline 122 (respectively).

MOP 410 provides to controller 420 a signal 412 which specifies or otherwise indicates the detected instance of the N branch predictions. Controller 420 is coupled to a trace table 430 or other suitable registry resource, entries of which—such as the illustrative entries 432a, ..., 432x shown—each comprise a trace of a different respective N branch predictions. For example, a given entry of table 430 comprises some or all of the features of trace 310. In the example embodiment shown, one entry 432a of table 430 is indexed by a tag value Ta, and comprises confidence metric values Ca1, ..., CaN each for a first N branch predictions. By contrast, another entry 432x of table 430 is indexed by a tag value Tx, and comprises other confidence metric values Cx1, ..., CxN each for a second N branch predictions. However, the number and/or contents of entries 432a, ..., 432x are merely illustrative, and not limiting on some embodiments. Although MOP 410 is shown as being distinct from controller 420 and table 430, in various other embodiments, controller 420 and/or table 430 are integrated in MOP 410.

In an embodiment, controller 420 calculates or otherwise determines a tag value (or other suitable index) based on an indication of the N branch predictions which is communicated via signal 412. In one such embodiment, the tag value is generated with a hash calculation which is based on a PC value for a branch instruction, or (for example) for an instruction which is a target of a predicted branch. With the tag value, controller 420 performs a search of table 430 to identify which (if any) of entries 432a, ..., 432x corresponds to the N branch predictions which were indicated by MOP 410 via signal 412. Where such a search results in a hit of one of the entries 432a, ..., 432x, controller 420 accesses the entry in question to determine (for example) the respective confidence metrics for some or all of the N branch predictions.

Based on a search of table 430 which results in a hit, controller 420 specifies or otherwise indicates the registered N branch predictions (using the illustrative signal 422, for example) to execution pipeline circuitry 490, which—in turn—prepares to execute one or more instructions based on the N branch predictions. Furthermore, controller 420 evaluates some or all of the respective confidence metrics for the N branch predictions, to determine whether any such branch prediction should also be subjected to validity testing (i.e., to determine, based on an additional branch prediction, whether the branch prediction in question is to be considered valid, or invalid). In some embodiments, a determination that a branch prediction is invalid results in processor 400 clearing some or all execution state of execution pipeline circuitry 490.

By way of illustration and not limitation, controller 420 performs an evaluation to determine whether a given branch prediction is considered to be of a low confidence type. For example, controller 420 compares a given confidence metric to a predetermined value representing a threshold minimum level of confidence. The threshold value is provided, for example, as a priori information by a manufacturer, distributer, administrator, test unit, or other agent. In an illustrative scenario according to some embodiments, a confidence metric is equal to an integer value in a range of possible integer values (e.g., a range from 0 to 63), wherein the threshold minimum confidence level is, for example, at a middle of the range (e.g., equal to 31). However, some embodiments use any of various other ranges, threshold levels and/or other techniques to represent and evaluate confidence information. Moreover, some embodiments are not limited with respect to a particular threshold confidence level, or to a particular basis on which, and/or source from which the threshold confidence level is provided to controller 420.

Where a given one of the N branch predictions is determined to be of low confidence, controller 420 outputs a signal 424 which is to provide, or otherwise identify, the low confidence branch prediction to prediction unit 480. Responsive to controller 420, prediction unit 480 performs a validation test for the low confidence branch prediction—e.g., by generating another branch prediction based on the same branch instruction for which the low confidence branch prediction was made by MOP 410. Where a low confidence prediction is determined to be invalid, prediction unit 480 generates a signal 482 to clear some or all of the execution state of execution pipeline circuitry 490.

In various embodiments, branch predictions by prediction unit 480 tend to be more complex and/or otherwise more reliable than those branch predictions by MOP 410. By way of illustration and not limitation, prediction unit 480, as compared to MOP 410, employs a more sophisticated branch prediction algorithm which is able to more accurately determine an outcome of a given branch instruction's execution. Additionally or alternatively, prediction unit 480, as compared to MOP 410, employs a larger number and/or size of one or more branch prediction tables (BTBs), for example.

In some embodiments, controller 420 is further coupled to receive one or more signals (e.g., including the illustrative signal 492 shown) which indicates whether a given branch prediction had a successful outcome. Signal 492 is provided by execution pipeline circuitry 490, for example (or by prediction unit 480, in another embodiment). A branch prediction is successful where, for example, it is determined by prediction unit 480 to be valid and, in some embodiment, where the branch prediction correctly indicates the branch which was actually taken by a subsequent execution of a corresponding branch instruction. By contrast, such a branch prediction is unsuccessful where it is instead determined to be invalid and/or incorrect. Based on the successful (or alternatively, unsuccessful) outcome of a given branch prediction—as indicated by signal 492—controller 420 updates a corresponding confidence metric at table 430 to indicate an increased (or alternatively, decreased) confidence in that branch prediction.

Although some embodiments are not limited in this regard, processor 400 further comprises additional circuitry to selectively provide one or more predictions to prediction unit 480 and execution pipeline circuitry 490, where (for example) a search of table 430 results in a miss. For example, processor 400 further comprises another line predictor 440 and selection logic (e.g., comprising the illustrative multiplexer circuits 450, 452) which facilitates selection between indicating a branch prediction—if any—which has been identified by controller 420, and indicating a line prediction which has been identified by line predictor 440.

In the example embodiment shown, multiplexer circuits 450, 452 are variously coupled to receive, from controller 420, a control signal 426 which indicates whether a search of table 430 has resulted in a hit (or alternatively, in a miss). Where a search hit is indicated by control signal 426, multiplexer circuit 452 provides—as an output signal 453— the one or more indications of the N branch predictions which were communicated by controller 420 via signal 422. Furthermore, the search hit results in multiplexer circuit 450 providing as an output signal 451 the indication of a low confidence branch prediction (if any) which was communicated by controller 420 via signal 424. By contrast, where a search miss is indicated by control signal 426, multiplexer circuit 450 and multiplexer circuit 452 each provide—via the respective output signals 451, 453—a different indication of a line prediction which line predictor 440 communicates to multiplexer circuits 450, 452 via signal 442.

FIG. 6A shows features of a method 600 to operate a processor according to an embodiment. Method 600 illustrates one example of an embodiment wherein a multi-offset predictor (MOP) provides predictions each to an execution pipeline, which is subject to being cleared at least in part based on a determination that one such prediction is invalid. In an embodiment, the determination is performed based on the detection of a low confidence in a branch prediction. Operations such as those of method 600 are performed, for example, with one of processors 100, 120, 400, 500—e.g., wherein method 200 includes or is otherwise based on some or all such operations.

As shown in FIG. 6A, method 600 comprises (at 601) detecting, in one cycle, an instance of N branch predictions. Method 600 further comprises performing an evaluation (at 602) to determine whether the N branch predictions detected at 601 are currently registered (e.g., in a trace table or other suitable resource). For example, the evaluation performed at 602 includes or is otherwise based on the determining of a tag value, or other suitable index, with which a trace table (for example) is to be searched—e.g., wherein the tag value is calculated based on the branch instructions for which the N branch predictions are made.

Where it is determined at 602 that the N branch predictions are not registered, method 600 (at 603) registers the N branch predictions—e.g., by storing to a trace table a trace which, for example, includes respective confidence metrics for each of the N branch predictions. In one such embodiment, some or all of the respective confidence metrics are each initially set to some baseline (e.g., default) value indicating a lowest confidence level in a range of possible confidence levels. As described herein, such confidence metrics are subject to being variously updated over time, where one or more other instances of the N branch predictions are subsequently detected.

Furthermore, where the N branch predictions are not registered, method 600 successively indicates N line predictions (at 604) both to execution pipeline circuitry and to a prediction unit—e.g., in lieu of indicating any of the N branch predictions to either of the execution pipeline circuitry or the prediction unit. After sending the N line predictions at 604, method 600 performs a next instance of the detecting at 601.

Where it is instead determined at 602 that the N branch predictions are registered, method 600 performs operations to indicate the N branch predictions to the execution pipeline circuitry, and to provide a low confidence branch prediction (if any) for evaluation to determine whether or not said low confidence branch prediction is invalid. By way of illustration and not limitation, method 600 (at 605) identifies a next one of the N branch prediction to be processed—e.g., starting with an earliest of the N branch predictions in the software program sequence. Method 600 then indicates this next branch prediction (at 606) to the execution pipeline circuitry—e.g., by providing or otherwise identifying to the execution pipeline circuitry a next instruction which is expected to be after (and based on) a respective branch instruction for which the prediction is made.

Method 600 further performs an evaluation (at 607) to determine whether, according to some predetermined criteria, the branch prediction most recently identified at 605 is a low confidence prediction. Where it is determined at 607 that there is insufficient confidence in the branch prediction, method 600 (at 608) specifies or otherwise indicates the branch predication to the prediction unit (such as one of prediction units 123, 480, for example). Where it is instead determined at 607 that there is sufficient confidence in the branch prediction, method 600 (at 609) specifies or otherwise indicates the line predication (e.g., in lieu of the branch prediction) to the prediction unit.

Method 600 further comprises performing an evaluation (at 610) to determine whether there is any remaining branch prediction of the N branch predictions which were most recently detected at 601. Where it is determined at 610 that there is at least one such remaining branch prediction, method 600 performs a next instance of the identifying at 605. Where it is instead determined at 610 that there is no such remaining branch prediction, method 600 performs a next instance of the detecting at 601.

FIG. 6B shows features of a method 620, according to an embodiment, to determine confidence information which facilitates the selective evaluation of whether a given branch prediction is invalid. In one embodiment, such a selective evaluation results in a state of an execution pipeline being cleared. Operations such as those of method 620 are performed, for example, with one of processors 100, 120, 400, 500—e.g., wherein method 200 or method 600 includes or is otherwise based on some or all such operations.

As shown in FIG. 6B, method 620 comprises (at 621) detecting an outcome of a registered branch prediction. In an embodiment, the detecting at 621 comprises controller 420, or other suitable circuit logic, receiving or otherwise detecting a signal (such as the illustrative signal 492) which specifies or otherwise indicates whether the execution of a branch instruction resulted in an outcome which was indicated by a corresponding branch prediction.

Method 620 further comprises (at 622) accessing a confidence metric which corresponds to the registered branch prediction. For example, the accessing at 622 comprises controller 420 identifying the prediction as being one of a recently detected N branch predictions, and searching table 430—using a tag which corresponds to said N branch predictions—for a respective one of the entries 432a, . . . , 432x. In an embodiment, the respective entry includes a confidence metric corresponding to the branch prediction.

Method 620 performs an evaluation (at 623) to determine, based on the outcome detected at 621, whether the branch prediction was correct. Where it is determined at 623 that the branch prediction was correct, method 620 (at 624) updates the corresponding confidence metric—in the entry accessed at 622—to indicate an increased confidence in said branch prediction. By way of illustration and not limitation, a value of the confidence metric is incremented by one or otherwise increased—e.g., unless the value already indicates some maximum possible level of confidence. After the updating at 624, method 600 performs a next instance of the detecting at 621.

Where it is instead determined at 623 that the branch prediction was incorrect, method 620 (at 625) updates the corresponding confidence metric to indicate a decreased confidence in said branch prediction. For example, a value of the confidence metric is reset to a baseline value (e.g., zero) or otherwise decremented. After the updating at 625, method 600 performs a next instance of the detecting at 621.

FIG. 6C shows features of a method 630, according to an embodiment, to selectively clear state of an execution pipeline based on whether a given prediction is valid. Operations such as those of method 630 are performed, for example, with one of processors prediction unit 123, prediction unit 480 or other suitable circuit logic—e.g., wherein method 600 and/or method 620 include or are otherwise performed based on some or all such operations.

As shown in FIG. 6C, method 630 comprises (at 631) receiving a prediction which comprises one of a low confidence branch prediction or a line prediction. For example, the receiving at 631 comprises prediction unit 480 receiving signal 451 from multiplexer circuit 450, wherein—based on control signal 426—signal 451 indicates a selected one of a line prediction indicated by signal 442, or a branch prediction indicated by signal 422.

Method 630 further comprises (at 632) determining a validity state corresponding to the prediction. In an embodiment, determining the validity state comprises determining whether—according to some criteria—the prediction is to be considered valid or, alternatively, invalid. For example, such determining comprises performing another prediction regarding the same instruction for which the prediction received at 631 was made—e.g., using a different prediction basis than that used for the received prediction.

Method 630 further comprises performing an evaluation (at 633) to determine whether the received prediction is valid. In various embodiments, the received prediction is determined to be valid where it is identified as being the same (i.e., predicting the same outcome) as the other prediction performed at 632. By contrast, the received prediction is determined to be invalid where it is instead identified as being different than (i.e., predicting the different outcome) said other prediction.

Where it is determined at 633 that the prediction is invalid, method 630 (at 634) provides a signal—such as the illustrative signal 482 from prediction unit 480—to clear some or all of the execution state of execution pipeline circuitry 490. Where it is instead determined at 633 that the prediction is valid, method 630 performs a next instance of the receiving at 631—e.g., without signaling that the execution state is to be cleared.

Figure 5:
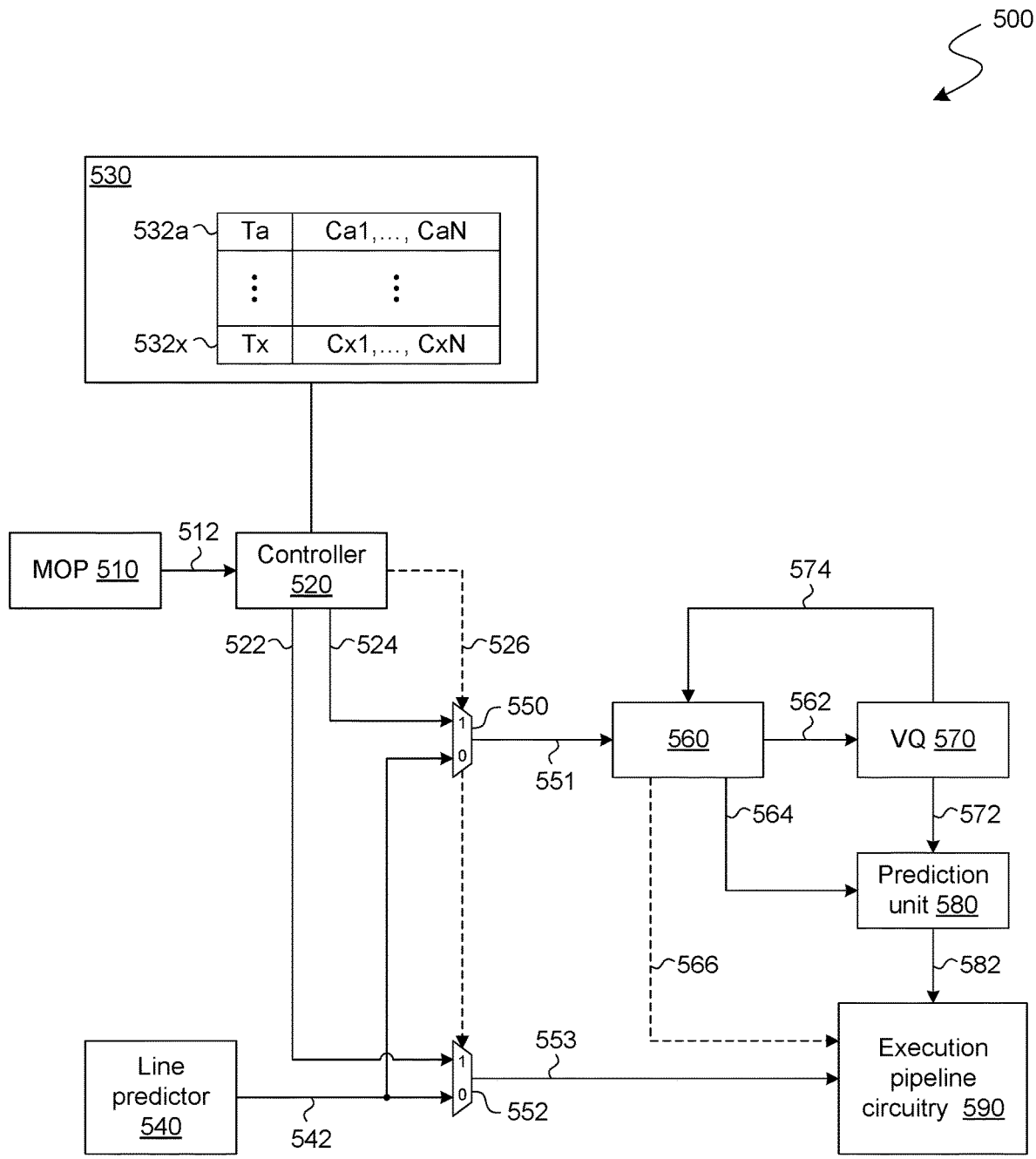
FIG. 5 shows a functional block diagram illustrating features of a processor to selectively clear an execution pipeline based on an invalidation of a branch prediction according to an embodiment.

FIG. 5 shows features of a processor 500 to selectively clear an execution pipeline based on an invalidation of a branch prediction according to an embodiment. The processor 500 illustrates an embodiment wherein a buffer (in this example, a verification queue, or "VQ") is coupled to regulate a provisioning of predictions to a prediction unit for validity testing. In various embodiments, processor 500 provides functionality of one of processors 100, 120, 400—e.g., wherein operations of one of methods 200, 600, 620, 630 are performed with processor 500.

To illustrate certain features of various embodiments, methods 640, 650—shown in FIGS. 6D, 6E (respectively)—are variously described herein with reference to operations by the example processor 400. However, in other embodiments, one or more operations of methods 640, 650 are performed with any of various other suitable devices which provide functionality described herein.

As shown in FIG. 5, processor 500 comprises a MOP 510, a controller 520, a table 530, a prediction unit 580, an execution pipeline circuitry 590, a line predictor 540, and multiplexer circuits 550, 552 which—for example—correspond functionally to MOP 410, controller 420, table 430, prediction unit 480, execution pipeline circuitry 490, line predictor 440, and multiplexer circuits 450, 452 (respectively). For example, table 530 comprises entries 532a, ... , 532x, which correspond functionally to entries 432a, ... , 432x, in an embodiment. Signals 512, 522, 524, 526, 542—variously communicated with MOP 510, controller 520, line predictor 540, and multiplexer circuits 550, 552—correspond functionally to signals 412, 422, 424, 426, 442 (respectively). Furthermore, signals 551, 553, 582—variously communicated with multiplexer circuits 550, 552, prediction unit 580, and execution pipeline circuitry 590—correspond functionally to signals 451, 453, 482 (respectively).

In the example embodiment shown, processor 500 further comprises a verification queue (VQ) 570—which is coupled between prediction unit 580 and multiplexer circuitry 550—and a monitor/selector unit 560 which (for example) selectively determines whether or not an indication of a given branch prediction is to be enqueued or otherwise buffered to VQ 570. A given prediction which is buffered to VQ 570 is subsequently debuffered for communication to prediction unit 580 via signal 572.

In an embodiment, monitor/selector unit 560 is coupled to receive an output signal 551 from multiplexer circuitry 550, wherein signal 551 indicates one of a low confidence branch prediction by MOP 510, or a line prediction by line predictor 540. Monitor/selector unit 560 is further coupled to monitor information (e.g., communicated by the illustrative signal 574 shown) which indicates whether VQ 570 is currently empty. Where signal 574 indicates that no predictions are currently enqueued by VQ 570, monitor/selector unit 560 sends the indication—which was provided by signal 551—in an output signal 562 for buffering to VQ 570. Otherwise, monitor/selector unit 560 sends the indication, in an output signal 564 to prediction unit 580, via a path which bypasses VQ 570.

Additionally or alternatively, monitor/selector unit 560 detects—e.g., based on signal 574—whether VQ 570 is currently full or otherwise above some threshold number of enqueued predictions. Where signal 574 indicates that a number of currently predictions enqueued by VQ 570 is below such a threshold number, monitor/selector unit 560 generates one or more signals (e.g., comprising the illustrative control signal 566 shown) to stop, stall or otherwise reduce a rate of one or more operations by execution pipeline circuitry 590. In some embodiments, controller 520 is further coupled to receive one or more signals (not shown) which indicate whether an outcome of a given branch prediction was successful—e.g., wherein controller 520 updates a corresponding confidence metric based on the outcome.

FIG. 6D shows features of a method 640 to selectively buffer predictions which are to be validated by a prediction unit according to an embodiment. Operations such as those of method 640 are performed, for example, with one of processors 100, 120, 500—e.g., wherein method 600, method 620 and/or method 630 include or are otherwise performed based on some or all such operations.

As shown in FIG. 6D, method 640 comprises (at 641) receiving a prediction which comprises one of a low confidence branch prediction or a line prediction. For example, the receiving at 641 comprises monitor/selector unit 560 receiving signal 551 from multiplexer circuitry 550, wherein—based on control signal 526—signal 551 indicates a selected one of a line prediction indicated by signal 542, or a branch prediction indicated by signal 522. Method 640 further comprises performing an evaluation (at 642) to determine whether a queue—referred to herein as a verification queue (VQ)—currently empty. In an embodiment the VQ—such as VQ 570—is provided to buffer predictions that have yet to be classified (e.g., according to method 630, for example) as being valid or invalid.

Where it is determined at 642 that the VQ is empty, method 640 (at 643) sends the prediction to the prediction unit via a path which bypasses the VQ. After sending the prediction at 643, method 640 performs a next instance of the receiving at 641. Where it is instead determined at 642 that the VQ is not empty, method 640 (at 644) buffers the prediction to the VQ—e.g., wherein the prediction is to be subsequently dequeued for processing by the prediction unit. After the buffering at 644, method 640 performs a next instance of the receiving at 641.

FIG. 6E shows features of a method 650, according to an embodiment, to selectively control an execution pipeline based on an ability of one or more predictions to be received for evaluation by a prediction unit. Operations such as those of method 650 are performed, for example, with one of processors 100, 120, 500—e.g., wherein one of methods 600, 620, 630, 640 includes or is otherwise performed based on some or all such operations.

As shown in FIG. 6E, method 650 comprises performing an evaluation (at 651) to determine whether a current number of predictions buffered at a verification queue (VQ) is above some predetermined threshold number. For example, the performing at 651 comprises or is otherwise based on monitor/selector unit 560 receiving a signal (such as the illustrative signal 574 shown) which identifies a number of predictions currently enqueued by VQ 570. In some embodiments, the evaluation is performed at 651 based on the sending of a prediction at 643 of method 600 (for example).

Where it is determined at 651 that the VQ is not currently above the threshold number of predictions, method 650 performs a next instance of the evaluation at 651—i.e., without signaling that operations of execution pipeline circuitry (such as that of execution pipeline 122) are to be stopped or otherwise stalled. Where it is instead determined at 651 that the VQ is above the threshold number, method 650 (at 652) sends a signal to stall an execution of one or more instructions by the execution pipeline circuitry. For example, method 650 stops or otherwise slows instruction execution while buffered predictions are successively processed by the prediction unit—e.g., until either the number of buffered predictions falls below the high threshold, or an invalid prediction results in a state of the execution pipeline being cleared. After the sending at 652, method 650 performs a next instance of the evaluation at 651.

In some embodiments, the evaluation at 651 comprises determining whether the VQ is full—e.g., wherein the signal sent at 652 is to stop all instruction execution by the execution pipeline circuitry. In an alternative embodiment, the evaluation at 651 comprises determining whether the VQ is at or above a threshold level which still allows for the VQ to enqueue one or more additional predictions. In one such embodiment, the signal sent at 652 is to provide a lower rate at which instructions are executed by the execution pipeline circuitry.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8A:
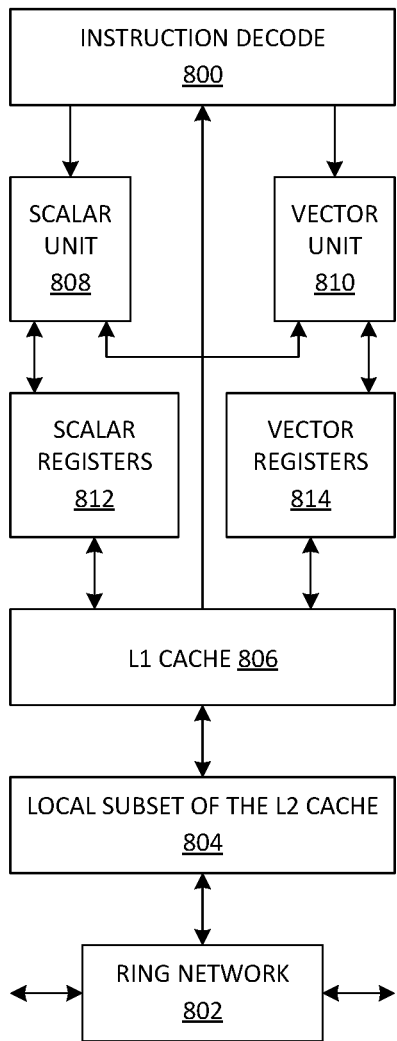
FIGS. 8A through 8B illustrate a block diagram of a more specific exemplary in-order core architecture, which core would be one of several logic blocks (including other cores of the same type and/or different types) in a chip.
Figure 8B:
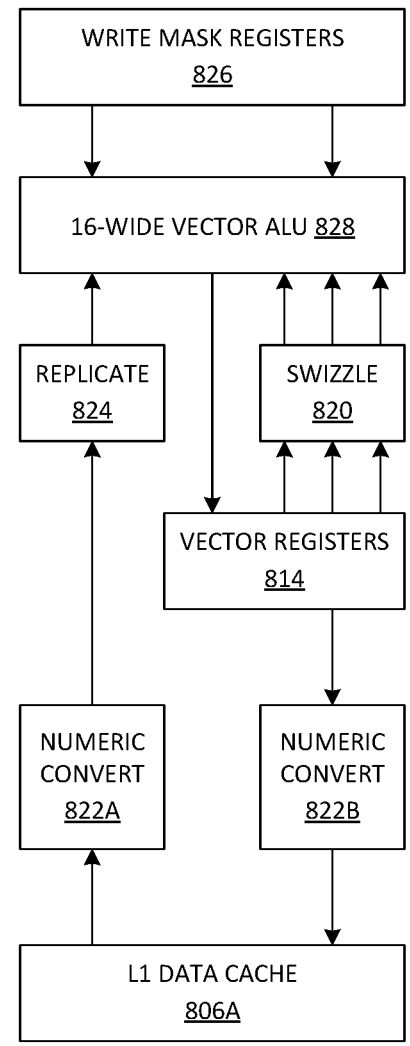

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
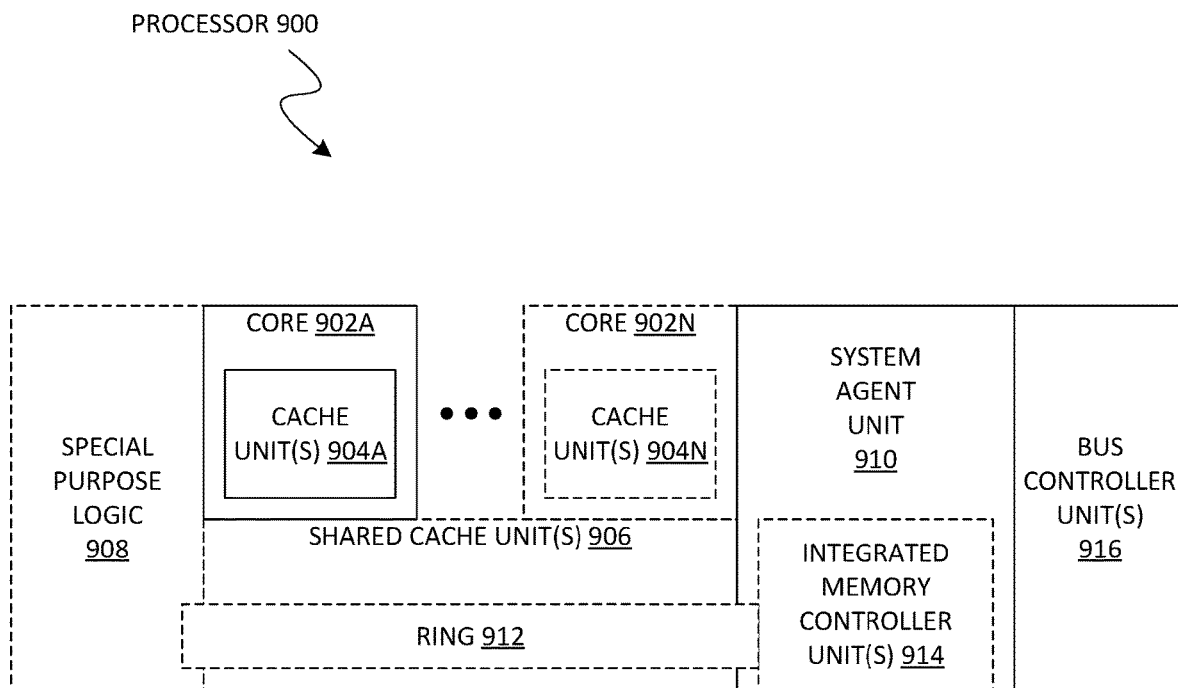
FIG. 9 is a block diagram of a processor that may have more than one core, may have an integrated memory controller, and may have integrated graphics according to an embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes respective one or more levels of caches 904A-N within cores 902A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10 through 13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
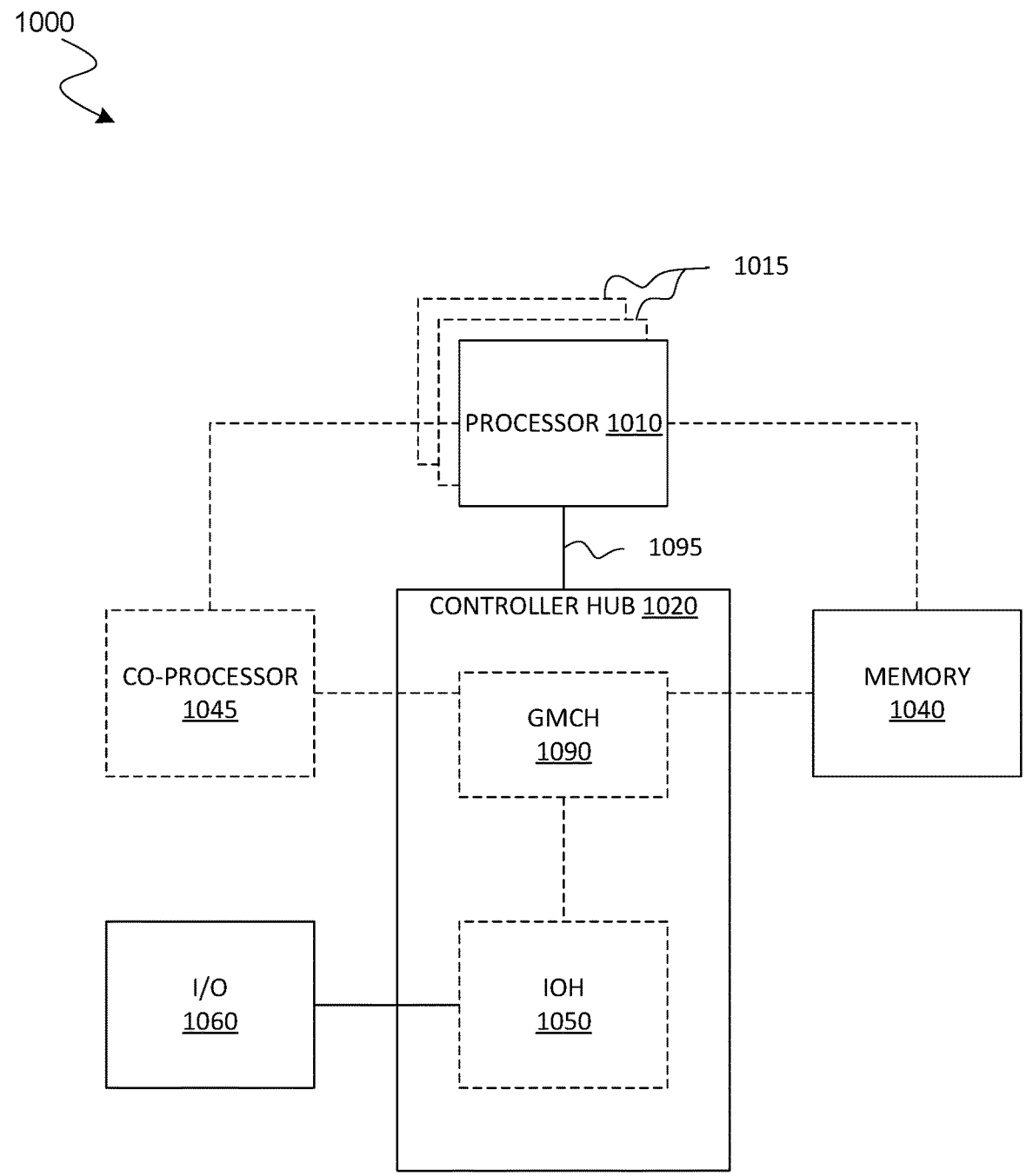
FIGS. 10 through 13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
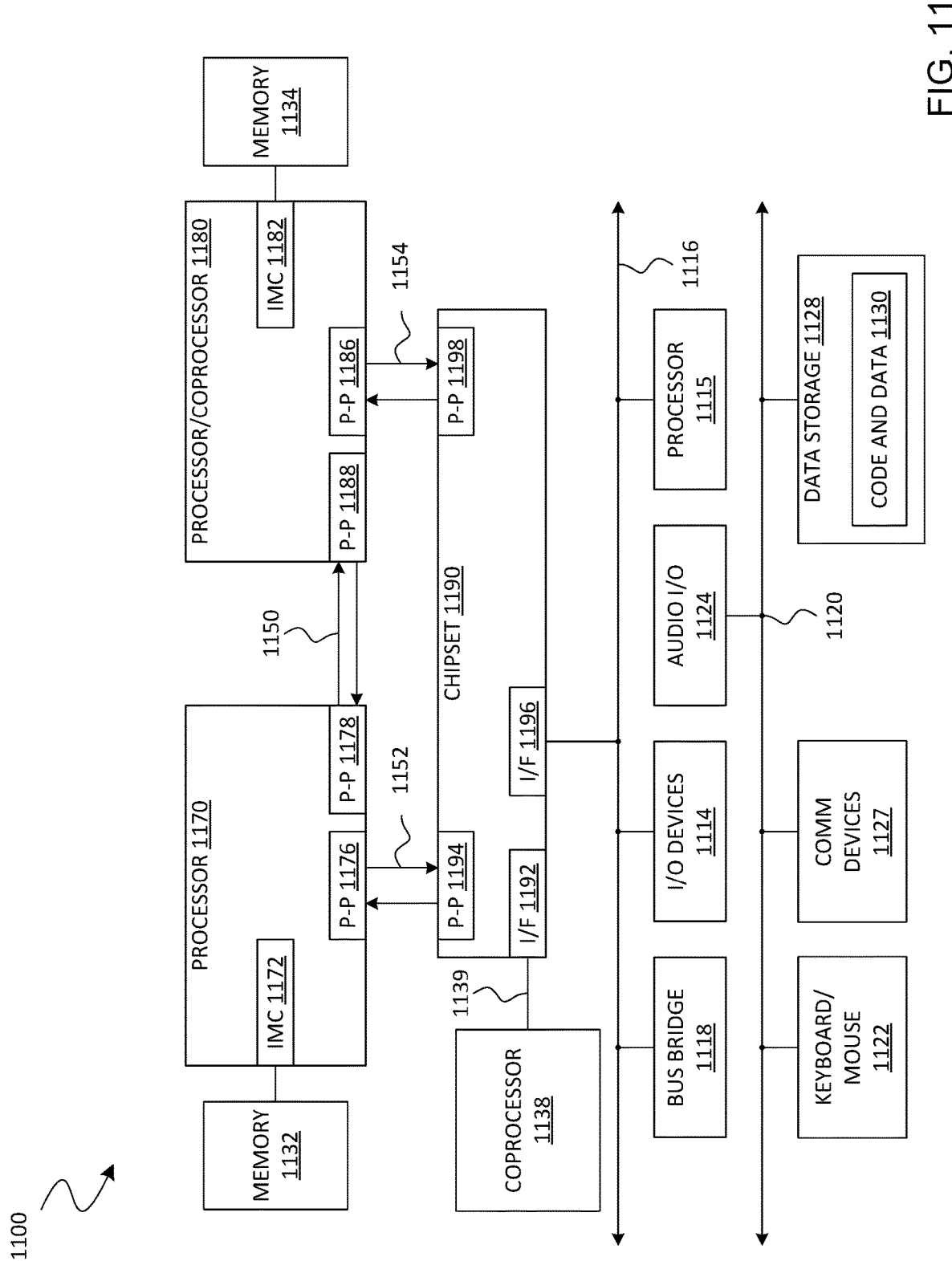

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller unit's point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192 and an interconnect 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
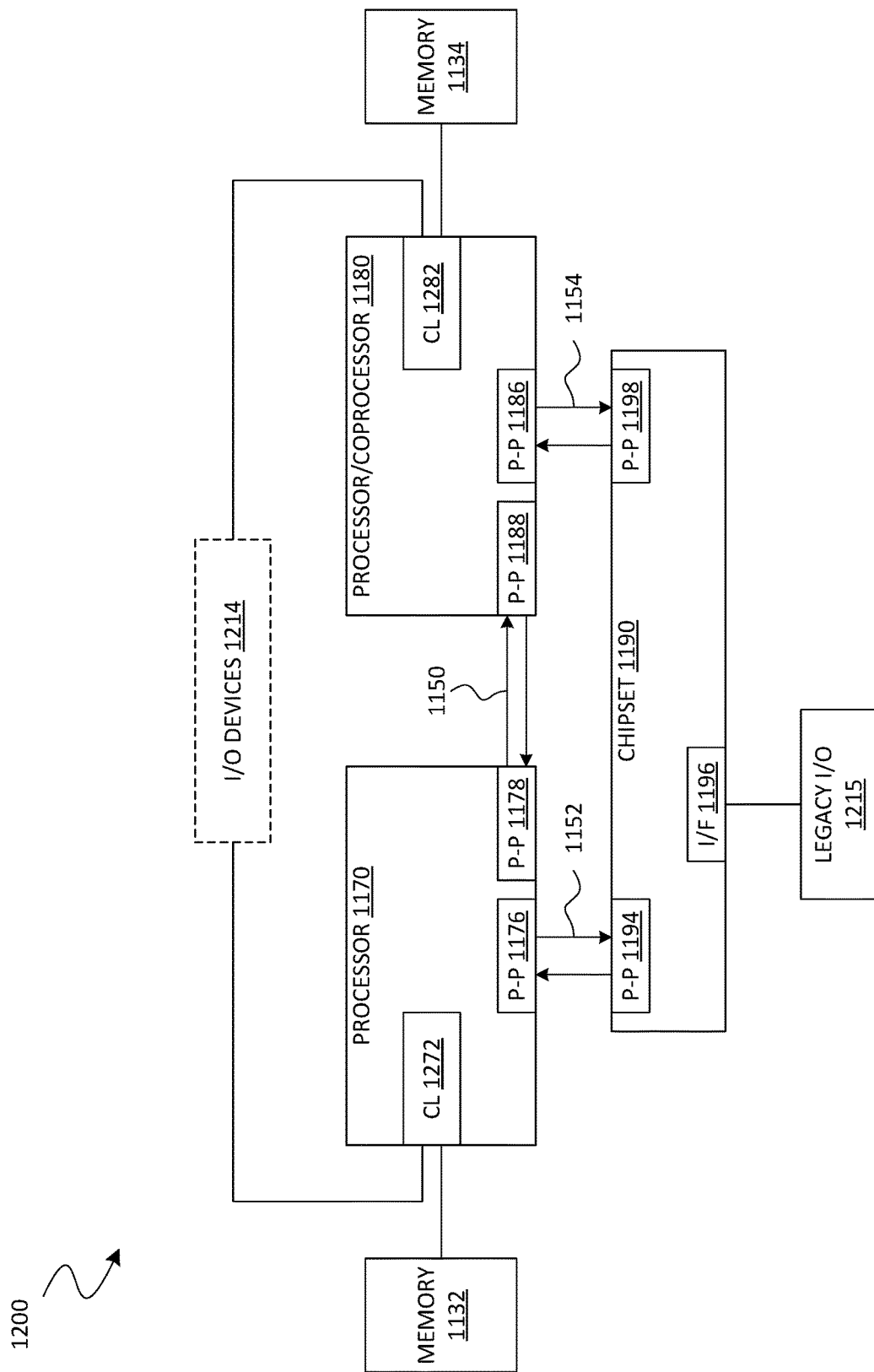

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the control logic 1272, 1282. Legacy I/O devices 1215 are coupled to the chipset 1190.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Techniques and architectures for executing instructions based on branch predictions are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, a processor comprises first prediction circuitry to detect an instance of N branch predictions which comprise a first branch prediction, wherein N is an integer greater than one, wherein the first prediction circuitry to detect the instance comprises the first prediction circuitry to identify each of the N branch predictions in a first cycle of a sequence of branch prediction cycles, wherein one or more of the N branch predictions are each based on a respective other one of the N branch predictions, controller circuitry coupled to the first prediction circuitry, wherein based on the instance, the controller circuitry is to indicate each of the N branch predictions to an execution pipeline, and based on a confidence metric which corresponds to the first branch prediction, determine whether to send the first branch prediction to a prediction unit, and second prediction circuitry coupled to the controller circuitry, wherein, where the first branch prediction is sent to the prediction unit, the second prediction circuitry is to perform an evaluation of a validity condition of the first branch prediction, and determine, based on the validity condition, whether to provide a signal to clear a state of the execution pipeline.

In one or more second embodiments, further to the first embodiment, the first branch prediction corresponds to a first branch instruction, and wherein the second prediction circuitry to perform the evaluation comprises the second prediction circuitry to generate a second branch prediction based on the first instruction, and determine whether the first branch prediction is consistent with the second branch prediction.

In one or more third embodiments, further to the first embodiment or the second embodiment, the controller circuitry is further to detect a successful outcome of the first branch prediction, and based on the successful outcome, update a value of the confidence metric to indicate an increased confidence in the first branch prediction.

In one or more fourth embodiments, further to the first embodiment or the second embodiment, the controller circuitry is further to detect an unsuccessful outcome of the first branch prediction, and based on the successful outcome, update a value of the confidence metric to indicate a decreased confidence in the first branch prediction.

In one or more fifth embodiments, further to the first embodiment or the second embodiment, the second prediction circuitry is further to receive a prediction after the prediction is debuffered from a buffer, and wherein the processor further comprises a buffer manager circuit to direct the first branch prediction to the second prediction circuitry, wherein, based on a determination that the buffer is empty, the buffer manager circuit is to communicate the first branch prediction to the second prediction circuitry via a path which bypasses the buffer.

In one or more sixth embodiments, further to any of the first, second, or fifth embodiments, the controller circuitry is to send the first branch prediction to the second prediction circuitry via a buffer, wherein the processor further comprises a buffer manager circuit to detect a condition wherein a utilization of the buffer is above a threshold level, and generate a signal, based on the condition, to reduce an operational rate of the execution pipeline.

In one or more seventh embodiments, further to the sixth embodiment, the buffer manager circuit to detect the condition comprises the buffer manager circuit to detect that the buffer is currently full, and wherein the signal is to at least temporarily stop an execution of instructions by the execution pipeline.

In one or more eighth embodiments, further to the sixth embodiment, the buffer manager circuit to detect the condition comprises the buffer manager circuit to detect that a total number of predictions enqueued to the buffer is currently greater than a threshold number, and is also currently less than a maximum possible number of predictions which the buffer is able to accommodate, and wherein, based on the signal, the execution pipeline is to transition to a positive rate of instruction execution.

In one or more ninth embodiments, further to any of the first, second, fifth, or sixth embodiments, the processor further comprises selector circuitry, wherein the controller circuitry to indicate each of the N branch predictions to the execution pipeline comprises the controller circuitry to signal the selector circuitry to select an indication of one of the N branch predictions over an indication of a prediction other than any of the N branch predictions.

In one or more tenth embodiments, a method at a processor, the method comprises detecting an instance of N branch predictions comprising a first branch prediction, wherein N is an integer greater than one, wherein detecting the instance comprises identifying each of the N branch predictions in a first cycle of a sequence of branch prediction cycles, wherein one or more of the N branch predictions are each based on a respective other one of the N branch predictions, based on the instance indicating each of the N branch predictions to an execution pipeline, identifying a confidence metric which corresponds to the first branch prediction, and based on the confidence metric, determining whether to send the first branch prediction to a prediction unit, and where the first branch prediction is sent to the prediction unit performing an evaluation to determine a validity condition of the first branch prediction, and based on the validity condition, determining whether to provide a signal to clear a state of the execution pipeline.

In one or more eleventh embodiments, further to the tenth embodiment, the first branch prediction corresponds to a first branch instruction, the method further comprises sending the first branch prediction to the prediction unit, and performing the evaluation, comprising with the prediction unit, generating a second branch prediction based on the first instruction, and determining whether the first branch prediction is consistent with the second branch prediction.

In one or more twelfth embodiments, further to the tenth embodiment or the eleventh embodiment, the method further comprises detecting a successful outcome of the first branch prediction, and based on the successful outcome, updating a value of the confidence metric to indicate an increased confidence in the first branch prediction.

In one or more thirteenth embodiments, further to the tenth embodiment or the eleventh embodiment, the method further comprises detecting an unsuccessful outcome of the first branch prediction, and based on the successful outcome, updating a value of the confidence metric to indicate a decreased confidence in the first branch prediction.

In one or more fourteenth embodiments, further to the tenth embodiment or the eleventh embodiment, the method further comprises after debuffering a prediction from a buffer, sending the prediction to the prediction unit, and sending the first branch prediction to a prediction unit, comprising based on a determination that the buffer is empty, communicating the first branch prediction to the prediction unit via a path which bypasses the buffer.

In one or more fifteenth embodiments, further to any of the tenth, eleventh, or fourteenth embodiments, the method further comprises sending the first branch prediction to the prediction unit via a buffer, detecting a condition wherein a utilization of the buffer is above a threshold level, and based on the condition, generating a signal to reduce an operational rate of the execution pipeline.

In one or more sixteenth embodiments, further to the fifteenth embodiment, detecting the condition comprises detecting that the buffer is currently full, and wherein the signal is to at least temporarily stop an execution of instructions by the execution pipeline.

In one or more seventeenth embodiments, further to the fifteenth embodiment, detecting the condition comprises detecting that a total number of predictions enqueued to the buffer is currently greater than a threshold number, and is also currently less than a maximum possible number of predictions which the buffer is able to accommodate, and wherein, based on the signal, the execution pipeline is to transition to a positive rate of instruction execution.

In one or more eighteenth embodiments, further to any of the tenth, eleventh, fourteenth, or fifteenth embodiments, indicating each of the N branch predictions to the execution pipeline comprises selecting an indication of one of the N branch predictions over an indication of a prediction other than any of the N branch predictions.

In one or more nineteenth embodiments, a system comprises a processor comprising first prediction circuitry to detect an instance of N branch predictions which comprise a first branch prediction, wherein N is an integer greater than one, wherein the first prediction circuitry to detect the instance comprises the first prediction circuitry to identify each of the N branch predictions in a first cycle of a sequence of branch prediction cycles, wherein one or more of the N branch predictions are each based on a respective other one of the N branch predictions, controller circuitry coupled to the first prediction circuitry, wherein based on the instance, the controller circuitry is to indicate each of the N branch predictions to an execution pipeline, and based on a confidence metric which corresponds to the first branch prediction, determine whether to send the first branch prediction to a prediction unit, and second prediction circuitry coupled to the controller circuitry, wherein, where the first branch prediction is sent to the prediction unit, the second prediction circuitry is to perform an evaluation of a validity condition of the first branch prediction, and determine, based on the validity condition, whether to provide a signal to clear a state of the execution pipeline, and a memory coupled to the processor, the memory to store data based on the first branch prediction.

In one or more twentieth embodiments, further to the nineteenth embodiment, the first branch prediction corresponds to a first branch instruction, and wherein the second prediction circuitry to perform the evaluation comprises the second prediction circuitry to generate a second branch prediction based on the first instruction, and determine whether the first branch prediction is consistent with the second branch prediction.

In one or more twenty-first embodiments, further to the nineteenth embodiment or the twentieth embodiment, the controller circuitry is further to detect a successful outcome of the first branch prediction, and based on the successful outcome, update a value of the confidence metric to indicate an increased confidence in the first branch prediction.

In one or more twenty-second embodiments, further to the nineteenth embodiment or the twentieth embodiment, the controller circuitry is further to detect an unsuccessful outcome of the first branch prediction, and based on the successful outcome, update a value of the confidence metric to indicate a decreased confidence in the first branch prediction.

In one or more twenty-third embodiments, further to the nineteenth embodiment or the twentieth embodiment, the second prediction circuitry is further to receive a prediction after the prediction is debuffered from a buffer, and wherein the processor further comprises a buffer manager circuit to direct the first branch prediction to the second prediction circuitry, wherein, based on a determination that the buffer is empty, the buffer manager circuit is to communicate the first branch prediction to the second prediction circuitry via a path which bypasses the buffer.

In one or more twenty-fourth embodiments, further to any of the nineteenth, twentieth, or twenty-third embodiments, the controller circuitry is to send the first branch prediction to the second prediction circuitry via a buffer, wherein the processor further comprises a buffer manager circuit to detect a condition wherein a utilization of the buffer is above a threshold level, and generate a signal, based on the condition, to reduce an operational rate of the execution pipeline.

In one or more twenty-fifth embodiments, further to the twenty-fourth embodiment, the buffer manager circuit to detect the condition comprises the buffer manager circuit to detect that the buffer is currently full, and wherein the signal is to at least temporarily stop an execution of instructions by the execution pipeline.

In one or more twenty-sixth embodiments, further to the twenty-fourth embodiment, the buffer manager circuit to detect the condition comprises the buffer manager circuit to detect that a total number of predictions enqueued to the buffer is currently greater than a threshold number, and is also currently less than a maximum possible number of predictions which the buffer is able to accommodate, and wherein, based on the signal, the execution pipeline is to transition to a positive rate of instruction execution.

In one or more twenty-seventh embodiments, further to any of the nineteenth, twentieth, twenty-third, or twenty-fourth embodiments, the processor further comprises selector circuitry, and wherein the controller circuitry to indicate each of the N branch predictions to the execution pipeline comprises the controller circuitry to signal the selector circuitry to select an indication of one of the N branch predictions over an indication of a prediction other than any of the N branch predictions.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
   first prediction circuitry to detect an instance of N branch predictions which comprise a first branch prediction, wherein N is an integer greater than one, wherein the first prediction circuitry to detect the instance comprises the first prediction circuitry to identify each of the N branch predictions in a first cycle of a sequence of branch prediction cycles, wherein one or more of the N branch predictions are each based on a respective other one of the N branch predictions;
   controller circuitry coupled to the first prediction circuitry; and
   second prediction circuitry coupled to the controller circuitry;
   wherein:
      based on the instance, the controller circuitry is to:
         indicate each of the N branch predictions to an execution pipeline; and
         based on a confidence metric which corresponds to the first branch prediction, determine whether to send the first branch prediction to the second prediction circuitry; and
      where the first branch prediction is sent to the second prediction circuitry, the second prediction circuitry is to:
         perform an evaluation of a validity condition of the first branch prediction; and
         determine, based on the validity condition, whether to provide a first signal to clear a state of the execution pipeline.

2. The processor of claim 1, wherein the first branch prediction corresponds to a first branch instruction, and wherein the second prediction circuitry to perform the evaluation comprises the second prediction circuitry to:
   generate a second branch prediction based on the first branch instruction; and
   determine whether the first branch prediction is consistent with the second branch prediction.

3. The processor of claim 1, wherein the controller circuitry is further to:
   detect a successful outcome of the first branch prediction; and
   based on the successful outcome, update a value of the confidence metric to indicate an increased confidence in the first branch prediction.

4. The processor of claim 1, wherein the controller circuitry is further to:
   detect an unsuccessful outcome of the first branch prediction; and
   based on the unsuccessful outcome, update a value of the confidence metric to indicate a decreased confidence in the first branch prediction.

5. The processor of claim 1, wherein the second prediction circuitry is further to receive a prediction after the prediction is debuffered from a buffer; and
wherein the processor further comprises:
   a buffer manager circuit to direct the first branch prediction to the second prediction circuitry, wherein, based on a determination that the buffer is empty, the buffer manager circuit is to communicate the first branch prediction to the second prediction circuitry via a path which bypasses the buffer.

6. The processor of claim 1, wherein the controller circuitry is to send the first branch prediction to the second prediction circuitry via a buffer, wherein the processor further comprises a buffer manager circuit to:
   detect a condition wherein a utilization of the buffer is above a threshold level; and
   generate a second signal, based on the condition, to reduce an operational rate of the execution pipeline.

7. The processor of claim 6, wherein the buffer manager circuit to detect the condition comprises the buffer manager circuit to detect that the buffer is currently full, and wherein the second signal is to at least temporarily stop an execution of instructions by the execution pipeline.

8. The processor of claim 1, further comprising selector circuitry, wherein the controller circuitry to indicate each of the N branch predictions to the execution pipeline comprises the controller circuitry to signal the selector circuitry to select an indication of one of the N branch predictions over an indication of a prediction other than any of the N branch predictions.

9. A method at a processor, the method comprising:
   detecting an instance of N branch predictions comprising a first branch prediction, wherein N is an integer greater than one, wherein detecting the instance comprises identifying each of the N branch predictions in a first cycle of a sequence of branch prediction cycles, wherein one or more of the N branch predictions are each based on a respective other one of the N branch predictions;
   based on the instance:
      indicating each of the N branch predictions to an execution pipeline;

identifying a confidence metric which corresponds to the first branch prediction; and based on the confidence metric, selectively sending the first branch prediction to a prediction unit; and where the first branch prediction is sent to the prediction unit:

performing an evaluation to determine a validity condition of the first branch prediction; and based on the validity condition, selectively providing a first signal to clear a state of the execution pipeline.

10. The method of claim 9, wherein the first branch prediction corresponds to a first branch instruction, the method further comprising:

sending the first branch prediction to the prediction unit; and performing the evaluation, comprising:

with the prediction unit, generating a second branch prediction based on the first branch instruction; and identifying one of:

a first condition wherein the first branch prediction is consistent with the second branch prediction; or a second condition wherein the first branch prediction is inconsistent with the second branch prediction.

11. The method of claim 9, further comprising:

detecting a successful outcome of the first branch prediction; and based on the successful outcome, updating a value of the confidence metric to indicate an increased confidence in the first branch prediction.

12. The method of claim 9, further comprising:

after debuffering a prediction from a buffer, sending the prediction to the prediction unit; and sending the first branch prediction to the prediction unit, comprising:

based on a determination that the buffer is empty, communicating the first branch prediction to the prediction unit via a path which bypasses the buffer.

13. The method of claim 9, further comprising:

sending the first branch prediction to the prediction unit via a buffer;

detecting a condition wherein a utilization of the buffer is above a threshold level; and based on the condition, generating a second signal to reduce an operational rate of the execution pipeline.

14. The method of claim 9, wherein indicating each of the N branch predictions to the execution pipeline comprises selecting an indication of one of the N branch predictions over an indication of a prediction other than any of the N branch predictions.

15. A system comprising:

a processor comprising:

first prediction circuitry to detect an instance of N branch predictions which comprise a first branch prediction, wherein N is an integer greater than one, wherein the first prediction circuitry to detect the instance comprises the first prediction circuitry to identify each of the N branch predictions in a first cycle of a sequence of branch prediction cycles, wherein one or more of the N branch predictions are each based on a respective other one of the N branch predictions;

controller circuitry coupled to the first prediction circuitry; and second prediction circuitry coupled to the controller circuitry;

wherein:

based on the instance, the controller circuitry is to:

indicate each of the N branch predictions to an execution pipeline; and based on a confidence metric which corresponds to the first branch prediction, determine whether to send the first branch prediction to the second prediction circuitry; and where the first branch prediction is sent to the second prediction circuitry, the second prediction circuitry is to:

perform an evaluation of a validity condition of the first branch prediction; and determine, based on the validity condition, whether to provide a first signal to clear a state of the execution pipeline; and a memory coupled to the processor, the memory to store data based on the first branch prediction.

16. The system of claim 15, wherein the first branch prediction corresponds to a first branch instruction, and wherein the second prediction circuitry to perform the evaluation comprises the second prediction circuitry to:

generate a second branch prediction based on the first branch instruction; and determine whether the first branch prediction is consistent with the second branch prediction.

17. The system of claim 15, wherein the controller circuitry is further to:

detect a successful outcome of the first branch prediction; and based on the successful outcome, update a value of the confidence metric to indicate an increased confidence in the first branch prediction.

18. The system of claim 15, wherein the second prediction circuitry is further to receive a prediction after the prediction is debuffered from a buffer; and wherein the processor further comprises:

a buffer manager circuit to direct the first branch prediction to the second prediction circuitry, wherein, based on a determination that the buffer is empty, the buffer manager circuit is to communicate the first branch prediction to the second prediction circuitry via a path which bypasses the buffer.

19. The system of claim 15, wherein the controller circuitry is to send the first branch prediction to the second prediction circuitry via a buffer, wherein the processor further comprises a buffer manager circuit to:

detect a condition wherein a utilization of the buffer is above a threshold level; and generate a second signal, based on the condition, to reduce an operational rate of the execution pipeline.

20. The system of claim 15, wherein the processor further comprises selector circuitry, and wherein the controller circuitry to indicate each of the N branch predictions to the execution pipeline comprises the controller circuitry to signal the selector circuitry to select an indication of one of the N branch predictions over an indication of a prediction other than any of the N branch predictions.

* * * * *